United States Patent
Kim et al.

(10) Patent No.: US 9,806,873 B2
(45) Date of Patent: Oct. 31, 2017

(54) METHOD AND APPARATUS FOR CONTROLLING DISCONTINUOUS RECEPTION IN MOBILE COMMUNICATION SYSTEM

(75) Inventors: Soeng Hun Kim, Yongin-si (KR); Gert-Jan Van Lieshout, Staines (GB); Jae Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 14/397,007

(22) PCT Filed: Aug. 7, 2012

(86) PCT No.: PCT/KR2012/006250
§ 371 (c)(1),
(2), (4) Date: Oct. 24, 2014

(87) PCT Pub. No.: WO2013/168850
PCT Pub. Date: Nov. 14, 2013

(65) Prior Publication Data
US 2015/0117286 A1    Apr. 30, 2015

Related U.S. Application Data

(66) Substitute for application No. 61/658,617, filed on Jun. 12, 2012.
(Continued)

(51) Int. Cl.
*H04W 52/02* (2009.01)
*H04L 5/00* (2006.01)
(Continued)

(52) U.S. Cl.
CPC .......... *H04L 5/0098* (2013.01); *H04L 5/0032* (2013.01); *H04W 4/18* (2013.01);
(Continued)

(58) Field of Classification Search
None
See application file for complete search history.

(56) References Cited

U.S. PATENT DOCUMENTS 8,203,987 B2    6/2012 Ishii et al.
8,649,288 B2    2/2014 He et al.
(Continued)

FOREIGN PATENT DOCUMENTS

CN    1760836 A    4/2006
CN    101496309 A    7/2009
(Continued)

OTHER PUBLICATIONS

Asustek: "Issues on DRX Activation", Jun. 24, 2008, pp. 1-7, XP055235030.
(Continued)

*Primary Examiner* — Chi H Pham
*Assistant Examiner* — Soon-Dong D Hyun
(74) *Attorney, Agent, or Firm* — Jefferson IP Law, LLP

(57) ABSTRACT

The present invention relates to a method and apparatus for controlling discontinuous reception (DRX) in a mobile communication system. The method for controlling the DRX of a terminal in a mobile communication system includes the steps of: receiving DRX-setting information from a base station; determining whether or not a first condition is satisfied, the first condition being that a current subframe exists between a first time point when receiving the DRX-setting information and a second time point when an event triggering the application of a short DRX cycle occurs; and applying a preset DRX cycle when the first condition is satisfied.

14 Claims, 17 Drawing Sheets

Related U.S. Application Data

(60) Provisional application No. 61/644,645, filed on May 9, 2012, provisional application No. 61/645,591, filed on May 10, 2012, provisional application No. 61/646,888, filed on May 14, 2012, provisional application No. 61/649,910, filed on May 21, 2012, provisional application No. 61/653,026, filed on May 30, 2012.

(51) Int. Cl.
*H04W 76/04* (2009.01)
*H04W 56/00* (2009.01)
*H04W 24/02* (2009.01)
*H04W 4/18* (2009.01)
*H04W 72/04* (2009.01)
*H04W 76/02* (2009.01)

(52) U.S. Cl.
CPC ....... *H04W 24/02* (2013.01); *H04W 52/0216* (2013.01); *H04W 52/0241* (2013.01); *H04W 56/0005* (2013.01); *H04W 56/0045* (2013.01); *H04W 72/042* (2013.01); *H04W 72/0426* (2013.01); *H04W 72/0453* (2013.01); *H04W 76/022* (2013.01); *H04W 76/025* (2013.01); *H04W 76/048* (2013.01); *Y02B 60/50* (2013.01)

(56) References Cited

U.S. PATENT DOCUMENTS

| | | |
|---|---|---|
| 2004/0053623 A1 | 3/2004 | Hoff et al. |
| 2006/0085794 A1 | 4/2006 | Yokoyama |
| 2006/0281466 A1 | 12/2006 | Gholmieh et al. |
| 2007/0066329 A1 | 3/2007 | Laroia et al. |
| 2007/0268877 A1 | 11/2007 | Buckley et al. |
| 2008/0240439 A1 | 10/2008 | Mukherjee et al. |
| 2009/0238098 A1 | 9/2009 | Cai et al. |
| 2009/0285141 A1* | 11/2009 | Cai ................ H04W 52/0251 370/311 |
| 2010/0067457 A1* | 3/2010 | Wang ............... H04W 72/0406 370/329 |
| 2010/0093386 A1 | 4/2010 | Damnjanovic et al. |
| 2010/0317345 A1* | 12/2010 | Futaki ............... H04W 36/0055 455/436 |
| 2010/0317356 A1 | 12/2010 | Roessel et al. |
| 2011/0002253 A1 | 1/2011 | Cha et al. |
| 2011/0051609 A1 | 3/2011 | Ishii et al. |
| 2011/0194505 A1 | 8/2011 | Faccin et al. |
| 2011/0195668 A1 | 8/2011 | Lee et al. |
| 2011/0201307 A1 | 8/2011 | Segura |
| 2011/0250910 A1 | 10/2011 | Lee et al. |
| 2011/0299415 A1 | 12/2011 | He et al. |
| 2012/0051297 A1 | 3/2012 | Lee et al. |
| 2012/0108199 A1 | 5/2012 | Wang et al. |
| 2013/0045735 A1 | 2/2013 | Kim et al. |
| 2013/0070682 A1 | 3/2013 | Kim et al. |
| 2013/0196659 A1* | 8/2013 | Damji ............... H04W 52/0225 455/434 |
| 2013/0250828 A1* | 9/2013 | Chou ............... H04W 72/0413 370/311 |
| 2014/0242974 A1 | 8/2014 | Lee et al. |
| 2015/0181526 A1 | 6/2015 | Lee et al. |
| 2016/0073345 A1* | 3/2016 | Fan ...................... H04W 76/048 370/311 |
| 2016/0080131 A1* | 3/2016 | Terry ................. H04L 5/0055 370/311 |

FOREIGN PATENT DOCUMENTS

| | | |
|---|---|---|
| CN | 101682896 A | 3/2010 |
| CN | 101841889 A | 9/2010 |
| EP | 1 973 355 A1 | 9/2008 |
| EP | 2 265 077 A1 | 12/2010 |
| JP | 2011-515043 A | 5/2011 |
| KR | 10-2010-0052064 A | 5/2010 |
| KR | 10-2011-0007223 A | 1/2011 |
| KR | 10-2011-0093642 A | 8/2011 |
| KR | 10-2011-0095092 A | 8/2011 |
| RU | 2 411 697 C2 | 4/2009 |
| RU | 2009 120 480 A | 12/2010 |
| WO | 98/01004 A2 | 1/1998 |
| WO | 98/26625 A2 | 6/1998 |
| WO | 2010/111194 A1 | 9/2010 |
| WO | 2010/121662 A1 | 10/2010 |
| WO | 2011/020002 A1 | 2/2011 |
| WO | 2011/038272 A1 | 3/2011 |
| WO | 2011/093666 A2 | 8/2011 |
| WO | 2011/099725 A2 | 8/2011 |
| WO | 2011/139088 A2 | 11/2011 |
| WO | 2011/155784 A2 | 12/2011 |
| WO | 2011/157292 A1 | 12/2011 |
| WO | 2012/008691 A2 | 1/2012 |
| WO | 2014-010993 A1 | 1/2014 |

OTHER PUBLICATIONS

CATT: "Clarification on the first occasion for using the Long/Short DRX Cycle",3GPP Draft; 36321 CR (REL-8) R2-090345 ,3rd Generation Partnership Project (3GPP), Mobile Competence Centre 350 , Route Des Lucioles F-06921 Sophia-Antipolls Cedex France, no. Ljubljana; Jan. 6, 2009, Jan. 6, 2009, XP050322032.

Huawei et al: "Which DRX cycle is used after the configuration of DRX" , 3GPP Draft; R2-113140 Which DRX Cycle Is Used After the Configuration of DRX , 3rd Generation Partnership Project (3GPP), Mobile Competence Centre 650 , Route Des Lucioles F-06921 Sophia-Antipolis Cedex France, vol. Ran WG2 , no. Barcelona , Spain; May 9, 2011, May 2, 2011, pp. 1/2-2/2 , XP050495139.

Huawei et al., The MDT Applicability of EPLMN, Change Request, 3GPP TSG-WG2 Meeting #75, Athens, Greece, Aug. 22-26, 2011, R2-114011, Version 10.2.0.

3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10), Dec. 2011, pp. 1-18, 3GPP TS 37.320, V10.4.0, 3GPP, Valbonne, France.

Intel Corporation, Support for UE Assistance Information for eDDA, 3GPP TSG RAN WG2 Meeting #77bis, Jeju, Korea, Mar. 26-30, 2012, pp. 1-5, R2-121746.

Ericsson et al., About DRX Configuration and UE Assistance, 3GPP TSG-RAN WG2 #78, Prague, Czech Republic, May 21-25, 2012, pp. 1-7, Tdoc R2-122587.

3rd Generation Partnership Project; Technical Specification Group Radio Access Network; Extending 850MHz Study Item Technical Report (Release 9), Aug. 2011, 3GPP TR 37.806, V1.1.0, 3GPP, Valbonne, France.

Ericsson et al., Multiple Frequency Band Indicators Per Cell, 3GPP TSG-RAN WG2 #75, Athens, Greece, Aug. 22-26, 2011, pp. 1-5, Tdoc R2-114299.

3rd Generation Partnership Project, "Technical Specification Group Radio Access Network; Study on Minimization of drive-tests in Next Generation Networks", 3rd Generation Partnership Project, Dec. 2009, pp. 1-24, (Release 9), 3GPP TR 36.1305, V9.0.0.

Wayback Machine, "23.1 RCC Connection Establishment", Aug. 12, 2011, pp. 1-4.

Ericsson, St-Ericsson; "Accessibility measurements for MDT"; Nov. 8, 2011; 3GPP TSG-RAN WG2 #76; R2-116148.

InterDigital Communications Handling of SCell Activation/Deactivation RF Retuning Interruptions, 3GPP TSG RAN WG2 #78; May 14, 2012; R2-122289.

(56) References Cited

OTHER PUBLICATIONS

Renesas Mobile Europe Ltd Considerations on retuning interruptions, 3GPP TSG-RAN WG4 Meeting #63; May 14, 2012; R4-123056.

* cited by examiner

METHOD AND APPARATUS FOR CONTROLLING DISCONTINUOUS RECEPTION IN MOBILE COMMUNICATION SYSTEM

TECHNICAL FIELD

The present invention relates to a method and apparatus for performing discontinuous reception (DRX) in a mobile communication system.

BACKGROUND ART

Mobile communication systems have been developed to provide communication services to users while they are moving. With the rapid development of communication technology, mobile communication systems have provided rapid data communication services as well as voice communication services.

The specification for Long Term Evolution (LTE), one of the next generation mobile communication systems, is being standardized by the $3^{rd}$ Generation Partnership Project (3GPP). LTE refers to a technology that can provide packet-based communication with a higher transmission rate of maximum 100 Mbps than the current data transmission rate. The standardization for LTE is almost completed.

It is very important to reduce the power consumption in wireless mobile communication systems. To this end, LTE mobile communication systems have employed discontinuous reception (DRX), so that UE devices transmit reverse-control signals only during the Active Time of a DRX cycle, thereby minimizing their power consumption.

New definition for operations of UE devices is required for their maximum process performance during the DRX.

DISCLOSURE OF INVENTION

Technical Problem

The present invention has been made in view of the above problems, and provides a method and apparatus for defining operations of user equipment (UE) devices in a situation forcing to increase beyond the process performance during the discontinuous reception (DRX) to reduce the power consumption, the complexity, and the costs of UE devices.

Solution to Problem

In accordance with an exemplary embodiment of the present invention, the present invention provides a method for controlling Discontinuous Reception (DRX) of a user equipment (UE) device in a mobile communication system, including: receiving DRX-configuration information from an Evolved Node B (ENB); determining whether a first condition is satisfied, the first condition determining whether a current sub-frame exists between a first time point that the DRX-configuration information is received and a second time point that an event for triggering the application of a short DRX cycle occurs; and applying, when a first condition is satisfied, a preset DRX cycle to the system.

In accordance with another exemplary embodiment of the present invention, the present invention provides a user equipment (UE) device for controlling Discontinuous Reception (DRX) in a mobile communication system, including: a transceiver for receiving DRX-configuration information from an Evolved Node B (ENB); and a controller for: determining whether a first condition is satisfied, the first condition determining whether a current sub-frame exists between a first time point that the DRX-configuration information is received and a second time point that an event for triggering the application of a short DRX cycle occurs; and applying, when a first condition is satisfied, a preset DRX cycle to the system.

Advantageous Effects of Invention

As described above, the present invention can keep UE related to DRX at a proper level of process performance, thereby reducing the power consumption and the costs.

BRIEF DESCRIPTION OF DRAWINGS

The features and advantages of the invention will become more apparent from the following detailed description in conjunction with the accompanying drawings, in which.

MODE FOR THE INVENTION

Hereinafter, exemplary embodiments of the present invention are described in detail with reference to the accompanying drawings. Detailed descriptions of well-known functions and structures incorporated herein may be omitted to avoid obscuring the subject matter of the invention. Before the embodiments of the present invention, descriptions regarding LTE system and carrier aggregation are provided first as follows.

Figure 1:
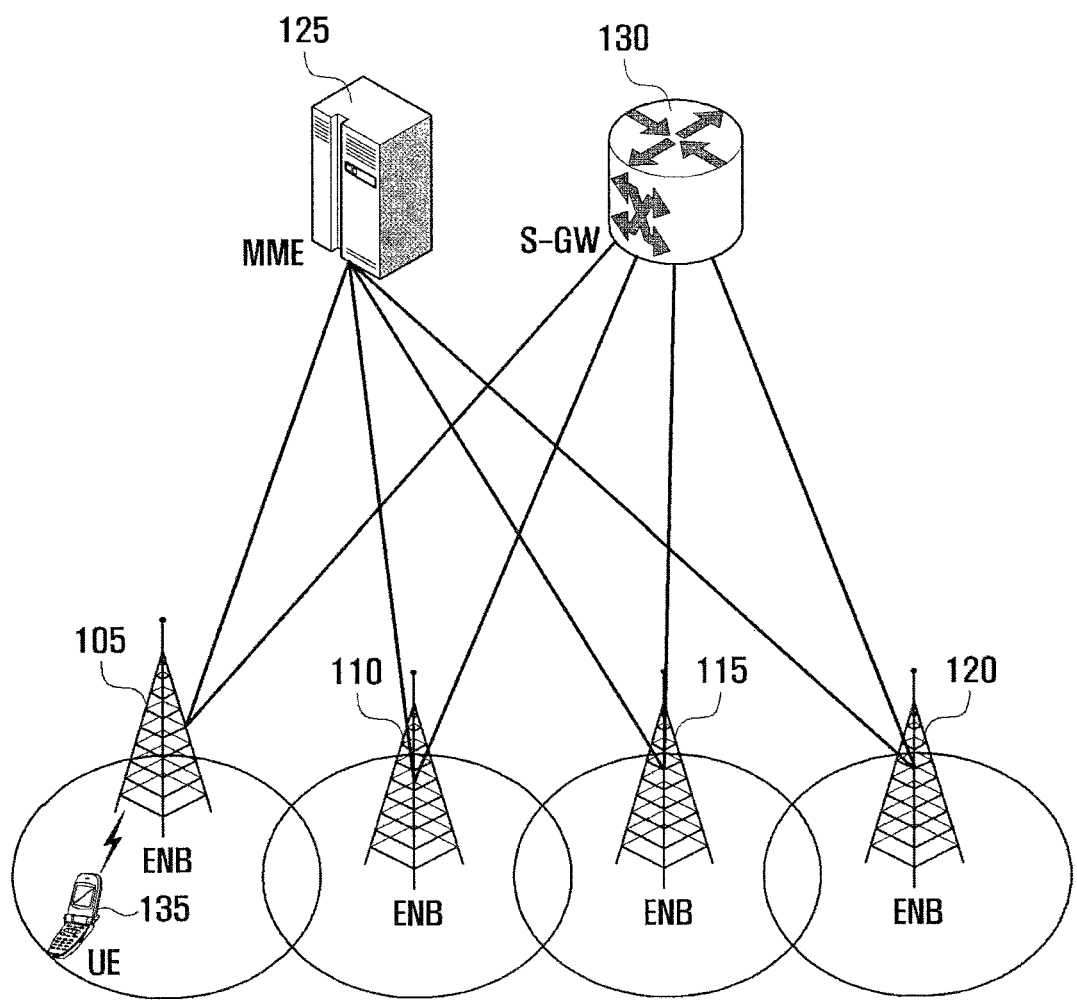
FIG. 1 illustrates a view of the configuration of an LTE system according to an embodiment of the present invention.

FIG. 1 illustrates a view of the configuration of an LTE system according to an embodiment of the invention.

Referring to FIG. 1, the LTE system configures the wireless access network, including Evolved Node Bs (ENBs) 105, 110, 115, and 120, a mobility management entity (MME) 125, and a serving-gateway (S-GW) 130. User equipment (UE) 135 is connected to an external network via the ENB 105, 110, 115, or 120 and the S-GW 130.

ENBs 105 to 120 correspond to conventional Node B of the UMTS system. ENBs 105 to 120 are connected to UE 135 via wireless channels, performing more complicated functions than conventional Node B. Since real-time Voice over IP (VoIP) services and all user traffics are served via shared channels in LTE system, devices are required to collect information regarding states, such as buffer states of UE, available transmission power states, channel states, etc., and to make a schedule. This job can be performed via ENBs 105 to 120. One ENB can control a number of cells. For example, in order to implement a transmission rate of 100 Mbps, LTE system employs orthogonal frequency division multiplexing (OFDM) at a bandwidth of 20 MHz. It also employs adaptive modulation & coding (AMC) to determine modulation scheme and channel coding rate, meeting with the channel state of UE. S-GW 130 is a device that establishes data bearers. S-GW 130 can create or remove data bearers according to the control of MME 125. MME 125 manages the mobility of UE and controls a variety of functions. MME 125 connects to a number of ENBs.

Figure 2:
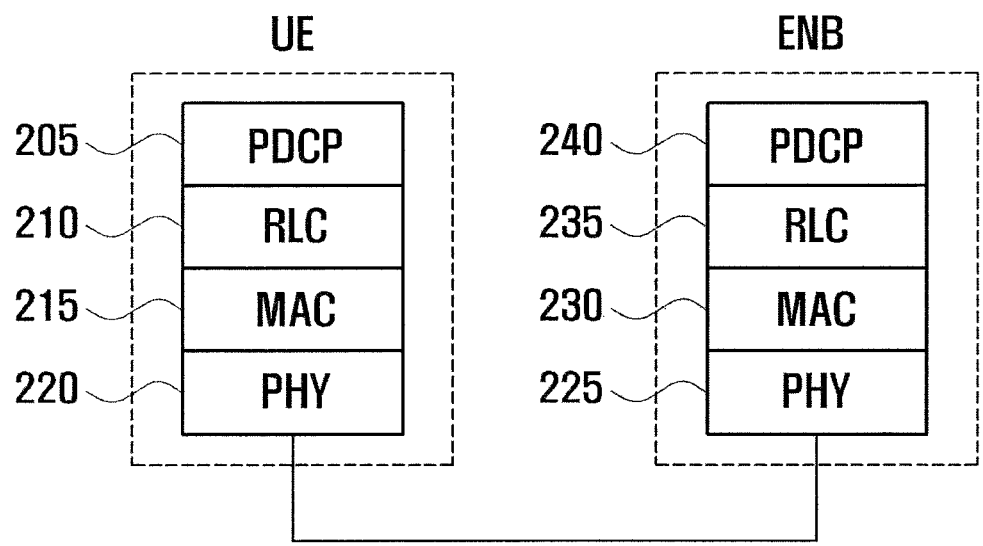
FIG. 2 illustrates a view of the wireless protocol stack of an LTE system according to an embodiment of the present invention.

FIG. 2 illustrates a view of the wireless protocol stack of an LTE system according to an embodiment of the invention.

Referring to FIG. 2, UE and ENB have packet data convergence protocols (PDCP) 205 and 240, radio link control (RLC) 210 and 235, and medium access controls (MAC) 215 and 230, respectively. PDCP 205 and 240 compress/decompress IP header. RLC 210 and 235 reconfigure PDCP packet data unit (PDU) in proper size and perform an ARQ operation. MAC 215 and 230 connect to a number of RLC layer devices configured in one UE device. MAC 215 and 230 multiplex RLC PUDs to MAC PDU, and de-multiplex RLC PDUs from MAC PDU. Physical layers (PHY) 220 and 225 in UE and ENB channel-code and modulate data from the upper layers, create OFDM symbols, and transmit them via a wireless channel. In addition, PHY 220 and 225 demodulate and channel-decode OFDM symbols transmitted via a wireless channel, and transfer them to the upper layers.

Figure 3:
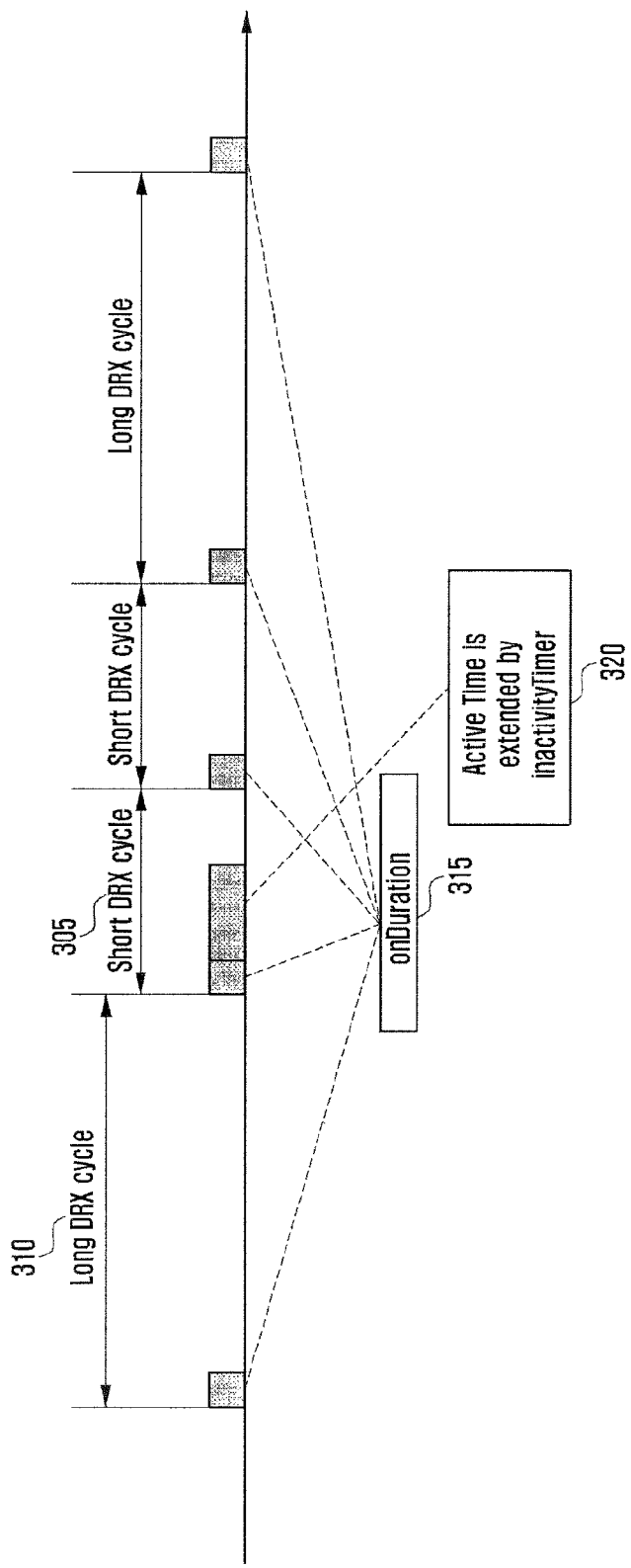
FIG. 3 illustrates a view that describes a general DRX cycle.

FIG. 3 illustrates a view that describes a general DRX cycle.

Discontinuous Reception (DRX) is a method that monitors a forward scheduling channel (Physical Downlink Control Channel (PDCCH)), only for a period of time, i.e., an active time, and transmits a reverse direction signal related to channel quality (Channel Status Indicator/Information (CSI) and Sounding Reference Signal (SRS)), thereby minimizing power consumption in the UE for non-active time.

Active time repeats at a DRX cycle. The application of Active time to UE varies depending on the traffic. For example, when UE meets a preset condition, it employs a relatively short period of time, i.e., a short DRX cycle 305 (or $1^{st}$ cycle). On the contrary, when UE doesn't meet the condition, it employs a long DRX cycle 310 (or $2^{nd}$ cycle).

At the DRX cycle, a timer for a relatively short period of active time, i.e., on duration 315, onDuration, is activated. When new data is scheduled during the onDuration 315, an inactivity timer, inactivityTimer, extends the period of active time (320). The inactivityTimer is driven or re-driven each time new data is scheduled, and also extends a period of active time when the traffic of UE increases.

CSI refers to feedback related to MIMO operations or the forward channel quality, such as Chanel Quality Indicator (CQI), Rank Indicator (RI), etc., and is transmitted via Physical Uplink Control Channel (PUCCH) or Physical Uplink Shared Channel (PUSCH). UE can be set to transmit CSI via a PUCCH transmission resource at a period of time. When UE transmits CSI via the instructed PUCCH transmission resource, this is expressed as 'CSI on PUCCH.' If a sub-frame for CSI on PUCCH is scheduled to be transmitted via PUSCH (which is a reverse direction channel for transmission of MAC PDU of user data), UE transmits CSI by using part of the PUSCH transmission resource in order to comply with a single carrier transmission protocol, which is expressed as 'CSI on PUSCH.'

<Embodiment 1>

According to the current standard, the transmission/reception of data may be performed in not a short DRX cycle but a long DRX cycle. This problem is caused because a short DRX cycle starts by the expiration of the inactivity timer; however the inactivity timer continues re-starting during the transmission/reception of data, so that it doesn't expire. In order to resolve the problem, the present invention is implemented to re-define the use condition of a short DRX cycle so that a short DRX cycle can be applied to the data transmission/reception even though an inactivity timer is operated. Meanwhile, the application of a long DRX cycle during the transmission/reception of data causes the following problems.

UE set by ENB transmits CSI and SRS only for the on duration, onDuration. This UE is called UE with a CQI-mask.

If a long DRX cycle is applied during the transmission/reception of data, the transmission frequency of CSI and SRS and this causes difficulty in making a schedule in ENB.

Figure 4:
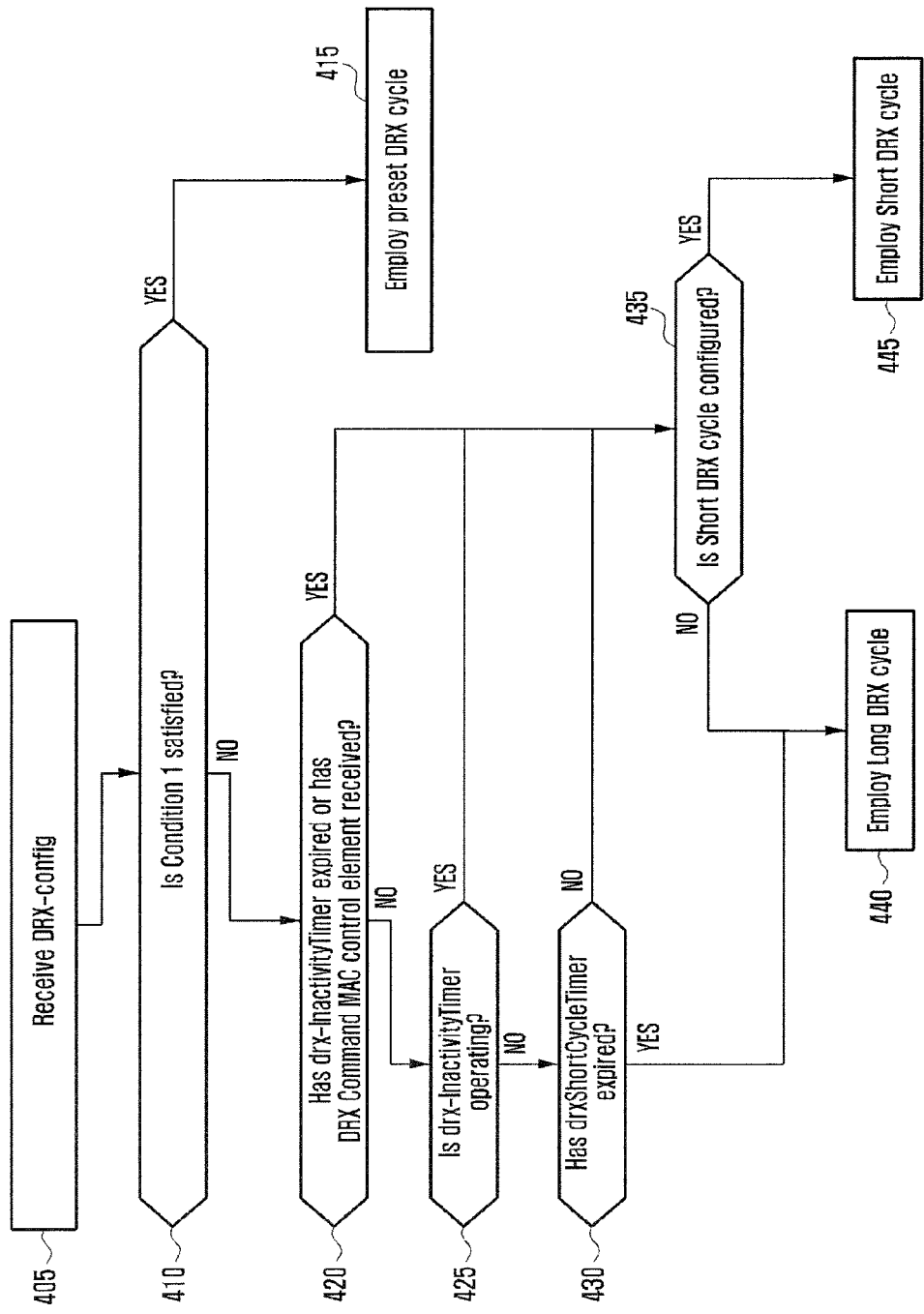
FIG. 4 illustrates a flow chart that describes operations of a UE device when a short DRX cycle is applied to active data transmission and reception, according to a first embodiment of the present invention.

FIG. 4 illustrates a flow chart that describes operations of UE according to a first embodiment of the present invention.

UE receives DRX configuration information from ENB at a time point at step 405. DRX configuration information includes a duration (length) of a short DRX cycle, duration (length) of a long DRX cycle, information for computing the start point of DRX, information regarding a duration (length) of on-duration (onDuration), and information regarding the expiration of an inactivity timer (inactivityTimer).

RRC of UE receives the DRX configuration information and transfers it to the MAC controller. The MAC controller performs DRX operations by using the control information, as follows.

UE determines whether meets to Condition 1 as follows before new subframes start, at step 410. When UE meets Condition 1, it proceeds with step 415. On the contrary, when UE doesn't meet Condition 1, it proceeds with step 420.

[Condition 1]

If a time point that DRX configuration information is received is denoted by t1 and a time point that an event occurs that triggers the application of a short DRX cycle is denoted by t2, a current subframe is between t1 and t2.

Condition 1 is a condition to determine type of DRX cycle to be applied after UE has received DRX configuration information before UE performs DRX.

For subframes meeting Condition 1, i.e., from after DRX operation starts until an application condition of a short DRX cycle is met, UE employs a pre-defined DRX cycle. Since data transmission/reception has been less activated before an application condition of a short DRX cycle is established, the type of pre-defined DRX cycle may be a long DRX cycle. In view of minimizing malfunction according to the change in a type of DRX cycle, it is more advantageous to employ a short DRX cycle. Considering these conditions, the present invention is implemented in such a way that ENB designates types of DRX cycles for UE devices at a DRX configuring process respectively.

When UE meets Condition 1 at step 410, it employs a preset DRX cycle and performs DRX operation at step 415. UE determines whether a preset DRX cycle is set to a short DRX cycle for example. If a preset DRX cycle has been set to a short DRX cycle, UE employs a short DRX cycle and otherwise a long DRX cycle.

When UE doesn't meet Condition 1 at step 410, it determines whether to meet Condition 2 as follows at step 420. When UE meets Condition 2 at step 420, it proceeds with step 435 where it starts a process for an application of a short DRX cycle. On the contrary, when UE doesn't meet Condition 2 at step 420, it proceeds with step 425.

[Condition 2]

Has the inactivityTimer expired in a subframe or the DRX command MAC Control Element (CE) (or DRX command), received?

When Condition 2 is met, the reason that a process for the application of a short DRX cycle starts is as follows.

The process where an inactivity timer has expired means that data has been completely transmitted/received. Even after UE has completely transmitted/received data, it may employ a short DRX cycle for a period of time. This is because resumption of data transmission/reception will be likely to happen during the period. In particular, when an inactivity timer has expired, UE drives a short DRX cycle timer, shortDrxCycleTimer. Only when UE ascertains that transmission/reception for new data doesn't happen until the short DRX cycle timer, shortDrxCycleTimer, has expired, it employs a long DRX cycle. UE employs a short DRX cycle while the short DRX cycle timer, shortDrxCycleTimer, is operating.

DRX command MAC CE refers to control information from ENB, for instructing UE to terminate the currently processing active time and enter into a battery saving mode. When ENB doesn't have forward data to transmit, it transmits the DRX command MAC CE to UE. Although ENB doesn't have forward data, it is likely to resume data transmission/reception for new data within a period of time after the end of data transmission/reception. Therefore, if UE receives DRX command MAC CE from ENB, it drives a short DRX cycle timer, shortDrxCycleTimer, and employs the short DRX cycle during the period.

When UE doesn't meet Condition 2 at step 420, it determines whether an inactivity timer is currently operating for subframes at step 425. When UE ascertains that an inactivity timer is currently operating for subframes at step 425, it proceeds with step 435. The process where an inactivity timer is currently operating means that data transmission/reception is being actively performed.

On the contrary, when UE ascertains that an inactivity timer isn't operating at step 425, it determines whether the short DRX cycle timer, shortDrxCycleTimer, has expired in the subframe at step 430. When UE ascertains that the short DRX cycle timer, shortDrxCycleTimer, has expired in the subframe at step 430, it employs a long DRX cycle and performs DRX operation at step 440.

On the contrary, when UE ascertains that the short DRX cycle timer, shortDrxCycleTimer, hasn't expired in the subframe at step 430, it determines whether a short DRX cycle is configured at step 435. For example, if DRX configuration information includes information related to a short DRX cycle, e.g., the duration (length) of a short DRX cycle, information regarding a short DRX cycle timer (short DrxCycleTimer), UE concludes that a short DRX cycle has been configured.

When UE ascertains that a short DRX cycle isn't configured at step 435, it proceeds with step 440. On the contrary, when UE ascertains that a short DRX cycle is configured at step 435, it proceeds with step 445.

UE employs a long DRX cycle and performs DRX operation at step 440. In particular, UE determines whether to start with onDuration for current subframes by using the following equation.

$$[(SFN*10)+\text{subframe number}]\,\text{modulo}\,(\text{longDRX-Cycle}) = \text{drxStartOffset} \quad \text{[Equation 1]}$$

If subframe number and SFN of current subframes satisfy Equation 1, UE starts with onDuration for the current subframes.

UE employs a short DRX cycle and performs DRX operation at step 445. In particular, UE determines whether to start with onDuration for current subframes by using the following equation.

$$[(SFN*10)+\text{subframe number}]\,\text{modulo}\,(\text{shortDRX-Cycle}) = (\text{drxStartOffset})\,\text{modulo}\,(\text{shortDRX-Cycle}) \quad \text{[Equation 2]}$$

If subframe number and SFN of current subframes satisfy Equation 2, UE starts with onDuration for the current subframes.

When an inactivity timer starts, i.e., when UE employing a long DRX cycle receives a new control command instructing forward or reverse transmission via PDCCH, it switches the long DRX cycle to a short DRX cycle, and this may occur within a period of time close to onDuration that is unpredicted. If UE has been configured with CQI-mask, it must perform CQI transmission within the period of time close to onDuration. Since a certain amount of time period is in general required to prepare for reverse transmission, this may make UE not to transmit CQI. To resolve this problem, a system may be considered to enhance the process performance in UE so that it can perform rapid preparation for CQI transmission. However, this is not preferable because of the following reasons.

Enhancing the process performance of UE for a peculiar case decreases the price-to-performance ratio deteriorate.

With the implement of highest process performance in UE, UE cannot be completely free from the peculiar case because of the difference between forward and reverse subframe boundaries.

The present invention not increases the process performance of UE but distinctively defines durations in which UE transmits CSI as follows, thereby preventing the creation of malfunction between UE and ENB.

Figure 5:
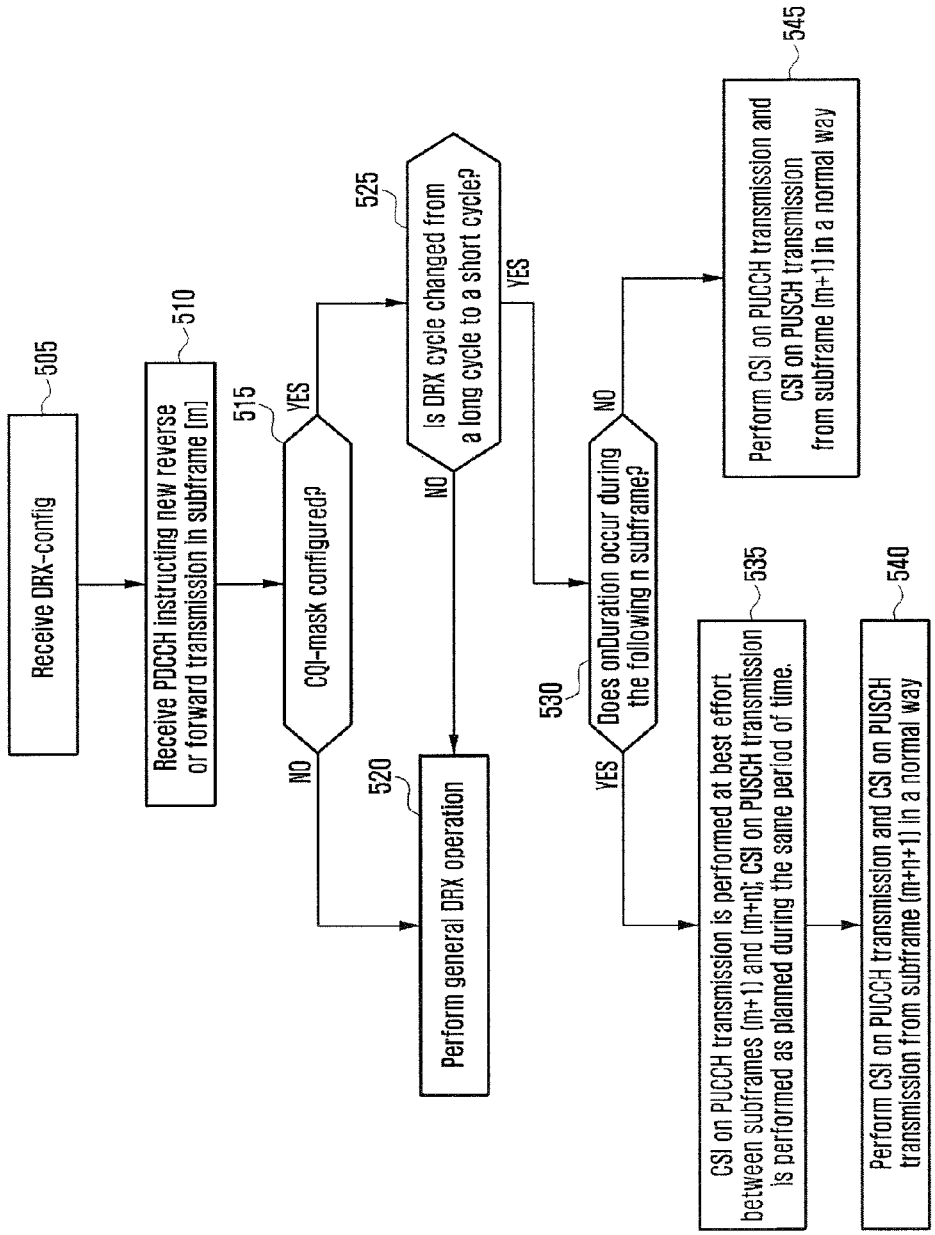
FIG. 5 illustrates a flow chart that describes a first example where operations of a UE device when an abrupt onDuration is created, according to a first embodiment of the present invention.

FIG. 5 illustrates a flow chart that describes a first example of operations of a UE device according to a first embodiment of the present invention.

UE receives DRX configuration information from ENB at a time point at step 505. DRX configuration information includes the duration (length) of a short DRX cycle, the duration (length) of a long DRX cycle, information for computing the start point of DRX, information regarding the duration (length) of on-duration (onDuration), and information regarding the expiration (length) of an inactivity timer (inactivityTimer).

RRC of UE receives the DRX configuration information and transfers it to the MAC controller. The MAC controller performs DRX operations by using the control information.

That is, UE determines whether a schedule is made by monitoring PDCCH in subframes defined as active time during the DRX operation and minimizes battery consumption without monitoring PDCCH in subframes not defined as active time. UE repeats these processes.

UE receives PDCCH for instructing new forward or reverse direction transmission in a subframe, m, at step 510.

UE determines whether CQI-mask is configured at step 515. When UE ascertains that CQI-mask is configured at step 515, it proceeds with step 525. On the contrary, when UE ascertains that CQI-mask isn't configured at step 515, it proceeds with step 520.

UE determines whether PDCCH reception causes a change in DRX cycle at step 525. PDCCH reception for instructing new transmission drives an inactivity timer. When UE has been employing a long DRX cycle at the time point when the inactivity timer operates, it switches the long DRX cycle to a short DRX cycle. Therefore, when UE that has been employing a long DRX cycle receives PDCCH for instructing new transmission, it meets the condition.

UE determines whether onDuration starts (or onDurationTimer starts) for n subframes followed by a subframe of receiving PDCCH at step 530. That is, UE determines whether any one of the n subframes satisfies Equation 1. When onDuration starts for n subframes, UE proceeds with step 535 and otherwise with step 540. n is a parameter related to process performance of UE that can deal with abrupt CSI transmission. It is preferable that n is a value for covering even low end UE with a low level of process performance.

Proceeding with step 535 means that onDuration starts at a time point that UE didn't predict according to the change of DRX cycle that UE didn't predict and therefore UE may not transmit CSI during the onDuration. UE performs CSI transmission, as follows, in a subframe between a subframe receiving PDCCH and the following n subframes.

CSI on PUCCH transmission is performed at best effort. That is, when CSI on PUCCH transmission is planned in a subframe between subframe (m+1) and subframe (m+n), it is performed if possible; however it didn't if not possible. In addition, during the duration, UE may skip CSI on PUCCH transmission regardless of the possibility of transmission. This is because ENB doesn't receive CSI on PUCCH from UE in the subframe. Therefore, skipping CSI on PUCCH makes UE prevent power consumption.

CSI on PUSCH transmission is normally performed. That is, CSI on PUSCH transmission is performed in subframes where CSI on PUSCH transmission has been planned. UE can predict CSI on PUSCH transmission before at least four subframes.

Operations of UE can be defined as follows at step 535.

Although UE doesn't change a DRX cycle between subframes (m+1) and (m+n), it still determines whether there is a subframe during the onDuration at step 535. When there is a subframe during the onDuration and although the subframe is between subframes (m+1) and (m+n), UE performs CSI on PUCCH transmission for the subframe. UE also performs CSI on PUCCH transmission for the rest of the subframes at best effort. That is, UE may skip CSI on PUCCH transmission for part of the n subframes after receiving PDCCH for instructing new transmission, where part of the n subframes satisfy a condition.

When the n subframes have progressed, UE performs CSI on PUCCH transmission and CSI on PUSCH transmission from subframe (m+n+1) in a normal way at step 540.

Proceeding with step 545 means that onDuration started at a time point that UE can process subframes despite a change in a DRX cycle that UE didn't predict. Therefore, UE performs CSI on PUCCH transmission and CSI on PUSCH transmission from a subframe right after a subframe receiving PDCCH, i.e., subframe (m+1), in a normal way.

Figure 6:
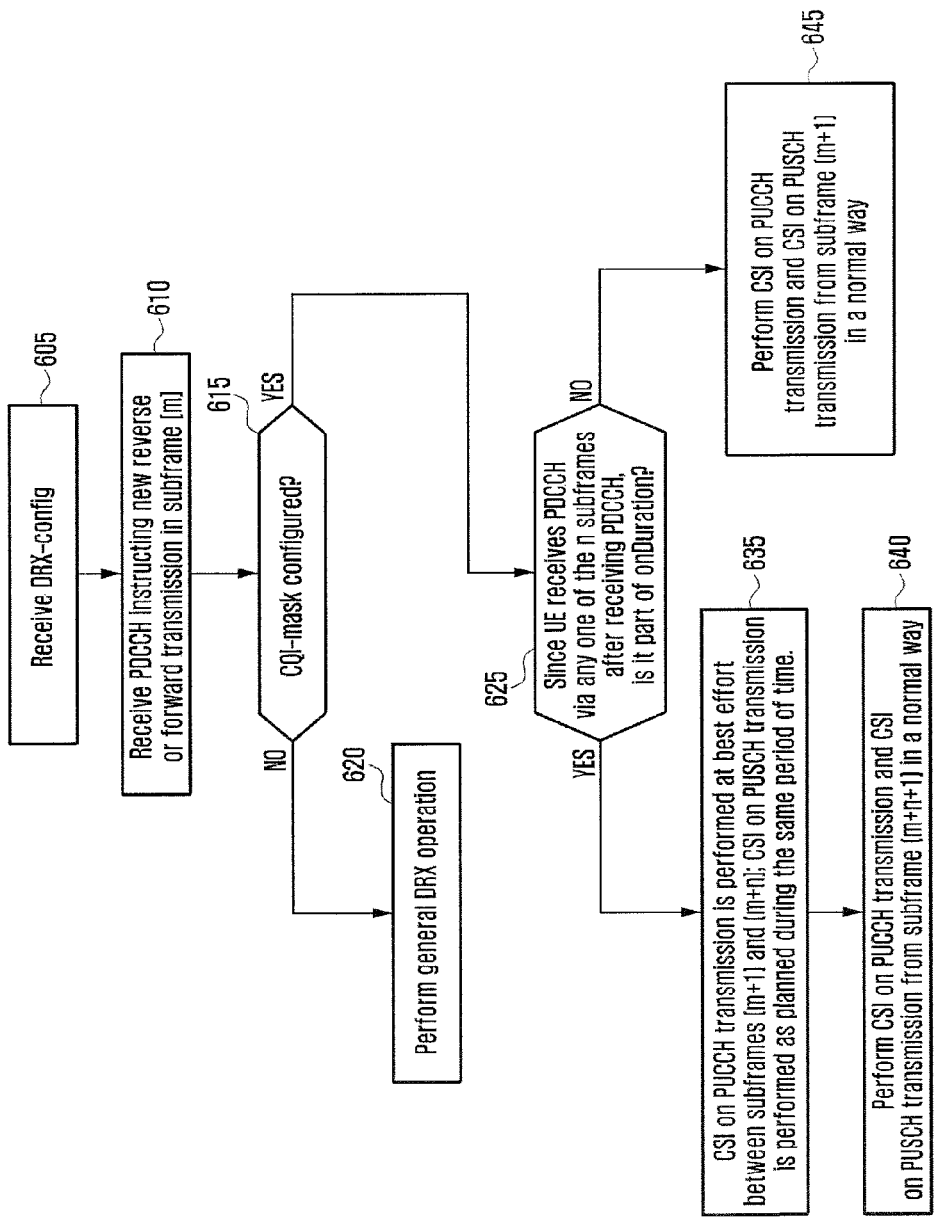
FIG. 6 illustrates a flow chart that describes a second example where operations of a UE device when an abrupt onDuration is created, according to a first embodiment of the present invention.

FIG. 6 illustrates a flow chart that describes a second example of operations of a UE device according to a first embodiment of the present invention.

Steps 605 to 620 are the same as steps 505 to 520 shown in FIG. 5.

Since UE receives PDCCH via any one of the n subframes after receiving PDCCH, it determines whether it is part of onDuration at step 625. For example, since a long DRX cycle is applied in the n subframes before receiving PDCCH, onDuration doesn't exist. However, when PDCCH is received, UE changes the long DRX cycle to a short DRX cycle and onDuration is created in the n subframes. If PDCCH is received right before the short DRX cycle timer, shortDrxCycleTimer, has expired, UE continues employing a short DRX cycle although it has predicted the change to a long DRX cycle. Therefore, part of the n subframes may be part of onDuration that UE didn't predict. When the condition is satisfied, i.e., when at least one of the n subframes after PDCCH has received in the subframe m is part of onDuration, UE proceeds with step 635 and otherwise proceeds with step 645.

Steps 635 to 645 are the same as steps 535 to 545 shown in FIG. 5.

Figure 7:
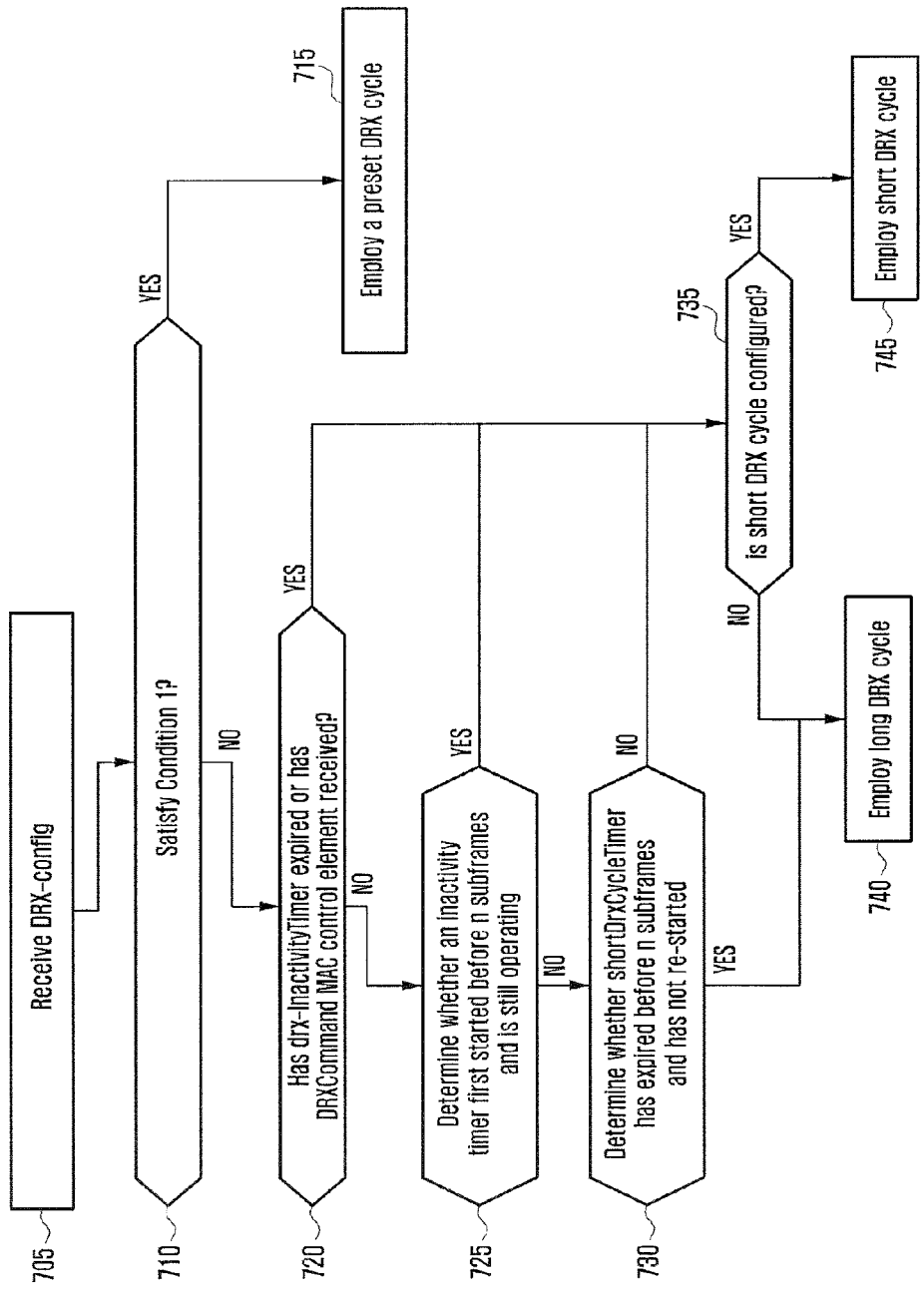
FIG. 7 illustrates a flow chart that describes a third example where operations of a UE device when an abrupt onDuration is created, according to a first embodiment of the present invention.

FIG. 7 illustrates a flow chart that describes a third example where operations of a UE device when an abrupt onDuration is created, according to a first embodiment of the present invention.

A change (or a maintenance) of DRX cycle that UE didn't predicted occurs as PDCCH is received. This causes a problem where UE doesn't perform CSI transmission. The problem can be resolved by delaying the change of DRX cycle by n subframes. UE employs a short DRX cycle not right after the inactivity timer first starts but after n subframes have been received. UE also employs a long DRX cycle not right after the short DRX cycle timer (shortDrxCycleTimer) has expired but after n subframes have been received.

Steps 705 to 720 are the same as steps 405 to 420 shown in FIG. 4.

UE determines whether an inactivity timer first started before n subframes (i.e., not re-started but first started from a pause state) and is still operating for the current subframe at step 725. When UE ascertains that an inactivity timer has been still operating, it proceeds with step 735 to employ a short DRX cycle. On the contrary, when UE ascertains that an inactivity timer doesn't operate, it determines whether a short DRX timer (shortDrxCycleTimer) has expired before n subframes and has re-started at step 730. When UE ascertains that a short DRX timer (shortDrxCycleTimer) has expired before n subframes and has re-started at step 730, it proceeds with step 740 and otherwise with step 735.

UE performs step 730 to respond an abrupt change from a short DRX cycle to a long DRX cycle. Step 730 is defined in the same as step 430 in that the expiration of a short DRX cycle timer (shortDrxCycleTimer) creating a DRX cycle transition can be in general predicted. That is, a determination can be made whether the short DRX cycle timer (shortDrxCycleTimer) has expired in the current subframe.

Steps 735 to 745 are the same as steps 435 to 445 shown in FIG. 4.

<Embodiment 2>

Sequence Number (SN) of 7 or 12 bits is used in PDCP layer. PDCP SDU corresponds to IP packet one-to-one. If the maximum size of a general IP packet is 1,500 bytes and Round Trip Time (RTT) at PDCP stage is approximately 25 ms during the handover, the maximum transmission rate is limited to 0.98 Gbps because of sequence number of 12 bits. With the high speed of LTE-A mobile communication system, the maximum transmission rate is not sufficient to comply with the current technology development. The present invention introduces a longer Sequence Number (hereinafter referred to as an extended sequence number), thereby to increase the maximum transmission rate.

TE/LTE-A mobile communication systems have been released every one year or every 1.5 years from release 8, Rel-8, as the first version. Introduction of extended sequence number makes it possible in Rel-11 or Rel-12. In the following description, the term 'new release' means a release to which the extended sequence number is introduced, and 'legacy release' means a release before introducing the extended sequence number. ENB for new release (hereinafter referred to as 'new ENB') establishes the extended sequence number to UE and uses it. On the contrary, ENB for legacy release (hereinafter referred to as 'legacy ENB') doesn't detect the extended sequence number and thus cannot use it.

The size of the extended sequence number may be set to a certain value; however, it is preferable to use 15 bits by considering the current format of PDCP PDU and extending 3 bits defined as reserved bits (R) in the current format. In the following embodiments of the present invention, the extended sequence number is explained assuming a size of 15 bits; however, it should be understood that it can be set to other sizes.

Figure 8:
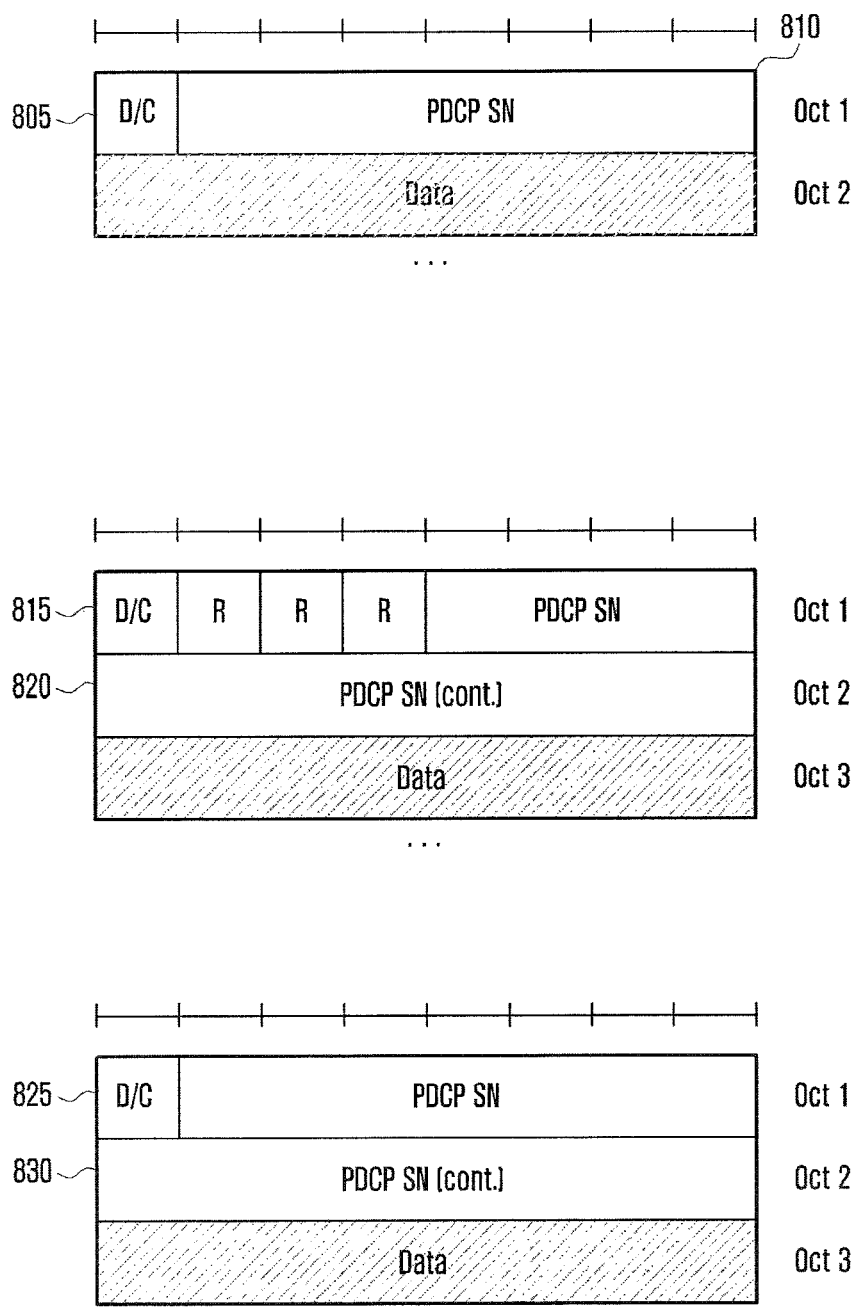
FIG. 8 illustrates a view that describes formats of PDCP PDU.

Referring to FIG. 8 illustrating formats of PDCP PDU, when PDCP uses an extended sequence number, PCP PDU includes D/C field of 1 bit labeled by reference number 825, sequence number of 15 bits labeled by reference number 830, and a data field.

When PDCP uses a sequence number of 12 bits, PCP PDU includes D/C field of 1 bit labeled by reference number 815, sequence number of 12 bits labeled by reference number 820, and a data field.

When PDCP uses an extented sequence number of 7 bits, PCP PDU includes D/C field of 1 bit labeled by reference number 805, sequence number of 7 bits labeled by reference number 810, and a data field.

The D/C field refers to information indicating whether corresponding PDU s data PDU or control PDU. The data field includes upper layer data such as IP packets.

When UE is handed over from a legacy ENB to a new ENB or vice versa, the size of PDCP sequence number may be varied. In that case, the parameters and operations for processing stored data can be defined to comply with the varied size of sequence number; however, this makes UE and systems increase in their complexity. If the size of sequence number is varied, the present invention removes current PDCP entity and then re-sets PDCP entity, thereby avoiding the complexity. In addition, when performing the removing and re-setting for PDCP entities, the present invention moves data from the current PDCP entity to be removed to new PDCP entity to be re-set, thereby minimizing data loss.

Figure 9:
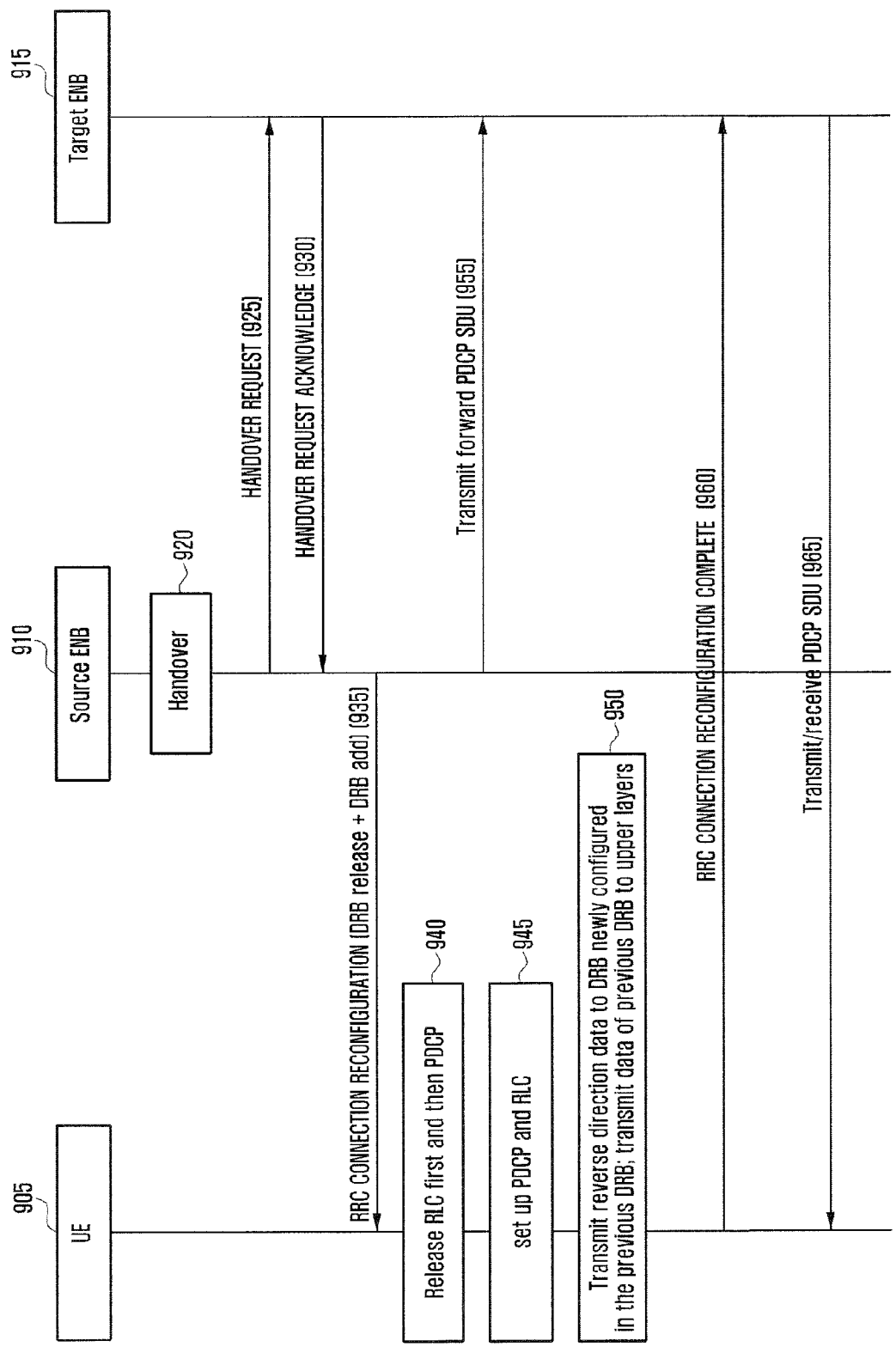
FIG. 9 illustrates a flow chart that describes the entire operation of a second embodiment of the present invention.

FIG. 9 illustrates a flow chart that describes a handover process where PDCP sequence number is varied.

Referring to FIG. 9, a mobile communication system includes UE 905, source ENB 910, and target ENB 915. The source ENB makes a determination to perform a handover with a target ENB (920). The handover is determined based on load of a current cell, channel states of UE, etc. The source ENB transmits a control message for requesting handover to the target ENB at step 925. The control message includes information as follows.

Target Cell ID: Identifier of handover target cell

E-RABs To Be Setup List: The E-RAB corresponds to a wireless bearer and Evolved Packet System (EPS) and is identified by eps-bearerIdentity. The information includes request QoS, eps-bearerIdentity for each EPS bearer, etc. Bearer is a path for processing data for requesting QoS, which is called an EPS bearer between UE and S-GW and an E-RAB between UE and ENB. Each E-RAB is configured with one or two wireless bearers.

RRC context: Configuration information, performance of UE (e.g., information regarding whether to support extended PDCP SN), etc., configured for UE by source ENB The target ENG transmits a control message for accepting handover to the source ENB at step 930. The control message includes information as follows.

E-RABs Admitted List: A list of E-RABs configured by the target ENB. The target ENB may make a configuration with only part of the E-RABs requested by the source ENB.

Target ENB to Source ENB Transparent Container: It includes control information that target ENB transmits to UE, e.g., RRC message for instructing handover. When releases in the source ENB have a higher priority than those in the target ENB or when an extended PDCP SN is used in the source ENB but not in the target ENB, the handover instruction message includes control information for releasing a Data Radio Bearer (DRB) that uses an extend PDCP SN and configuring a new DRB corresponding to EPS bearer that has been connected to the DRB. The new DRB is configured not to use an extended PDCP SN.

The source ENB transmits an RRC message for instructing handover to UE at step 935. The control message includes information as follows.

Mobility control information (mobilityConfigInfo): It includes target cell-related information, e.g., PCI, frequencies of a target cell, etc.

Radio resource configuration information (radioResourceConfigDedicated): It includes DRB configuration information applied to a target cell. Data Radio Bearer (DRB) is one-to-one mapped to EPS bearer. The mapping relation between DRB and EPS bearer is established by including the EPS bearer identifier in the DRB configuration information. If UE is handed over to an ENB that doesn't support extended PDCP SN, in an case where an EPS bearer x is mapped to a DRB y and an extended PDCP SN is used in the DRB y, the ENB releases the DRB y from the UE, creates a DRB z that uses general PDCP SN, and makes an instruction to maps it to an EPS bearer x. This operation can be performed by: including fullConfig in an RRC connection reconfiguration message (RRCConnectionReconfiguration) (hereinafter called Signaling 1); or by configuring an DRB and control information for releasing the DRB connected to the EPS bearer and then including control information for connecting to the EPS bearer in one RRC control message (hereinafter called Signaling 2). Including fullConfig in an RRC connection reconfiguration message means that current RRC configuration, e.g., all DRBs configured by DRB configuration information, is released; and a DRB is set up by using new DRB configuration information instructed in the RRCConnectionReconfiguration message. That is, this process may instruct an automatic release of the configuration by using the existing configuration information. This is advantageous to reduce overhead, compared with instructing DRBs on the release specifically and respectively.

UE releases a DRB that the UE has received an instruction to release at step 940. If Signaling 2 has been used, UE releases a DRB whose drb-identity value is included in control information, drb-ToReleaseList. To the end, UE first releases RLC and then PDCP. If Signaling 1 has been used, UE releases DRBs mapped to eps bearer identifiers (eps-BearerIdntity) on the list, drb-ToAddModList. That is, UE releases DRBs mapped to eps-BearerIdentity that is/are listed on the drb-ToAddModList and configured in Current UE configuration. Releasing DRB means that data, stored in PDCP transmission/reception entity and RLC transmission/reception entity, is deleted and the entities are removed. When the condition at step 935 is satisfied, UE releases DRB; however it doesn't delete data. This will be described in detail later, referring to step 950.

UE sets up a DRB that the UE has received an instruction to set up at step 945. UE sets up a DRB referring to the list, drb-ToAddModList. drb-ToAddModList is configured in the following Table 1 and its details are described in the specification TS36.331.

UE identifies DRBs, complying with the following conditions, at step 950.

If Signaling 1 has been used, for DRBs complying with the following conditions, UE doesn't delete forward data stored in released DRBs, but transfers them to the upper layer.

In a case where Signaling 1 has been used, DRB whose eps-bearerIdentity value is included in the drb-ToAddModList and is part of the current UE configuration, i.e., if an RRCConnectionReconfiguration message including fullConfig is received, and If eps-bearerIdentity in a mapped state from the current configured DRBs is included in drb-ToAddModList, DRB for the eps-bearerIdentity satisfies the condition in the current configuration.

In a case where Signaling 2 has been used, if a DRB associated with an eps-bearerIdentity is released via RRC control message and a new DRB is added and associated with the eps-bearerIdentity in the same message, corresponding DRB satisfies the conditions.

For DRBs satisfying the conditions, UE doesn't delete data stored in the DRBs right before they are released. UE transfers the forward data to the upper layer and the reverse data to DRBs that have been newly set up. The forward data stored in the DRB refers to data that can perform assembly to RLC SDU, from among the data stored in the RLC reception buffer, and also to data stored in PDCP window. As described above, for the DRB, as RLC is first released and then PDCP is released, data stored in the RLC is transferred to the upper layer via the PDCP (PDCP is an upper layer with respect to the RLC, and IP layer is an upper layer with respect to the PDCP).

Reverse data stored in the DRB means data stored in a transmission buffer of the PDCP. That is, reverse data stored in the DRB may be the following data of the data store in the PDCP transmission buffer.

Data of Type 1: data that has not been transferred to lower layers (PDCP SDU for which no PDU has been submitted to the lower layer yet)

Data of type 2: from among data that has been transferred to lower layers where the delivery has not been confirmed by the lower layers, SDU with the lowest sequence number and the following SDUs (PDCP SDUs for which a corresponding PDU has been submitted to lower layers prior to the PDCP release, starting from the first SDU for which the delivery of the corresponding PDUs has not been confirmed by the lower layer). In addition, only data that has been

TABLE 1

```
DRB-ToAddModList ::=                                  SEQUENCE (SIZE (1..maxDRB)) OF DRB-ToAddMod
DRB-ToAddMod ::=SEQUENCE {
    eps BearerIdentity                                    INTEGER (0..15)
       OPTIONAL,             -- Cond DRB-Setup
    drb-Identity                                          DRB-Identity,
    pdcp-Config                                           PDCP-Config
                  OPTIONAL,  -- Cond PDCP
    rlc-Config                                            RLC-Config
                  OPTIONAL,  -- Cond Setup
    logicalChannelIdentity                                INTEGER (3..10)
       OPTIONAL,             -- Cond DRB-Setup
    logicalChannelConfig                                  LogicalChannelConfig        OPTIONAL,
       -- Cond Setup
    ...
}
``` transferred to lower layers, where the delivery has not been confirmed by the lower layer, can be defined as type 2.

For example, when PDCP is released, if PDCP SDU of ~[100] has been stored in the PDCP transmission buffer; PDCP SDU of ~[90] has been transferred; and transmission of PDCP SDU [75] and PDCP SDU [80] has not been confirmed, data of type 1 is PDCP SDU [91]~PDCP SDU [100] and data of type 2 is PDCP SDU [75]~PDCP SDU [90]. Data of type 2 is PDCP SDU [75] and PDCP SDU [80].

Figure 10:
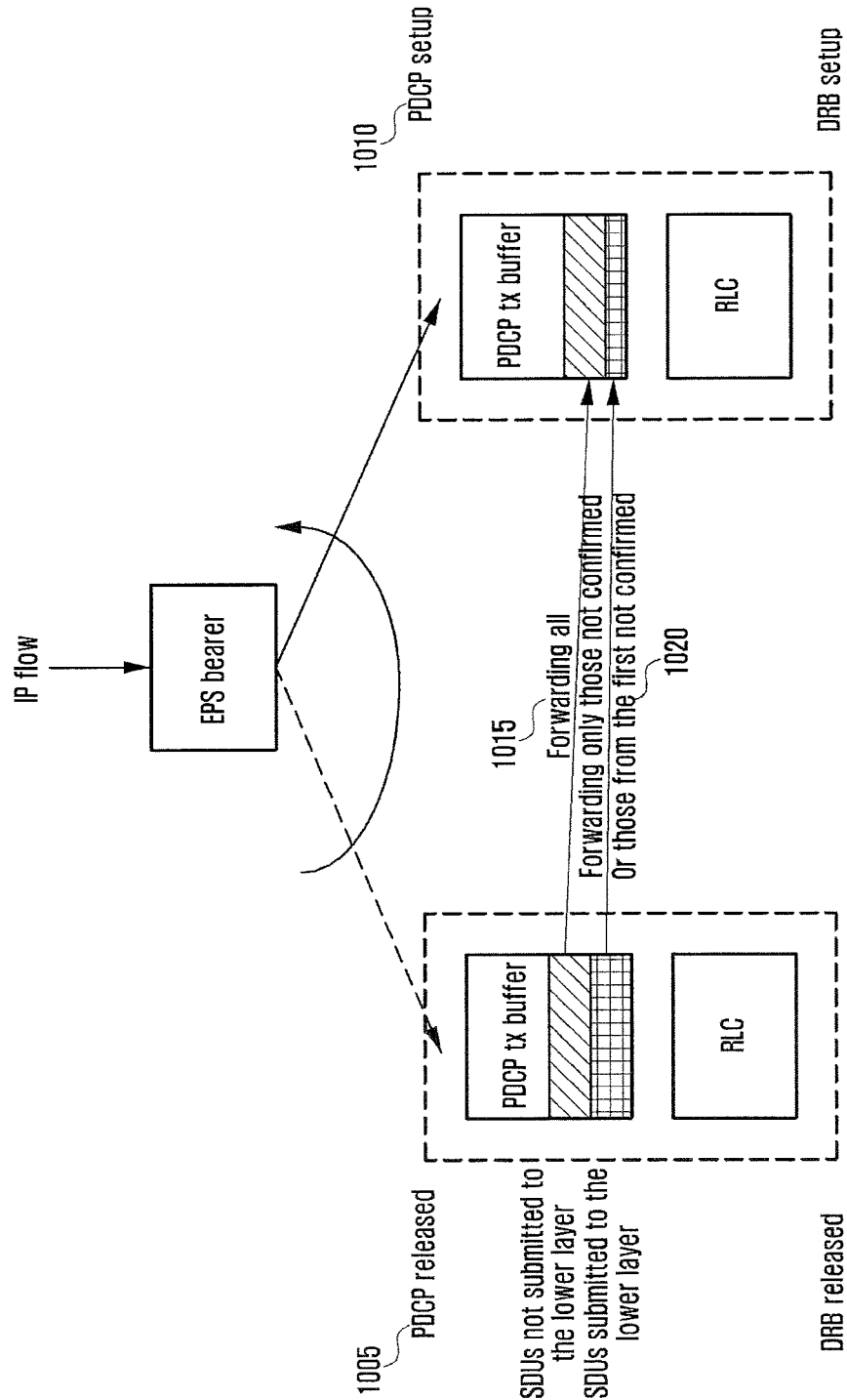
FIG. 10 illustrates a view that describes local transfer of data in the system.

Referring to FIG. 10, for DRBs satisfying the conditions, UE transmits data of type 1 (1015) and data of type 2 (1020) of the released PDCP 1005, to PDCP 1010, set up by mapping with the same eps-bearerIdentity (local transfer). PDCP SDUs are transmitted in the order of COUNT of PDCP SDUs. In addition, PDCP SDUs are transmitted in a First-In First-Out (FIFO) from the PDCP buffer. The COUNT refers to sequence number for ratio/inverse-ratio in the PDCP and is 32 bits in size, where HFN is 32-n bits from the front and PDCP SN is n bits from the end. n refers to the size of PDCP SN.

The source ENB forwards the following SDUs to the target ENB at step 955.

PDCP SDU that has not been transmitted to UE yet

SDU that has been transmitted to UE, where the delivery has not been confirmed by the lower layer UE forward-synchronizes with target cell and performs a random access at step 960. If random access is completed in success, UE concludes that handover has been completed in success and transmits an RRC CONNECTION RECONFIGURATION COMPLETE message to the target ENB.

UE and ENB initialize Hyper Frame Number (HFN) and PDCP SN to '0' at step 965. The target ENB receives PDCP SDUs from the source ENB and transmits them to the UE in order.

Figure 11:
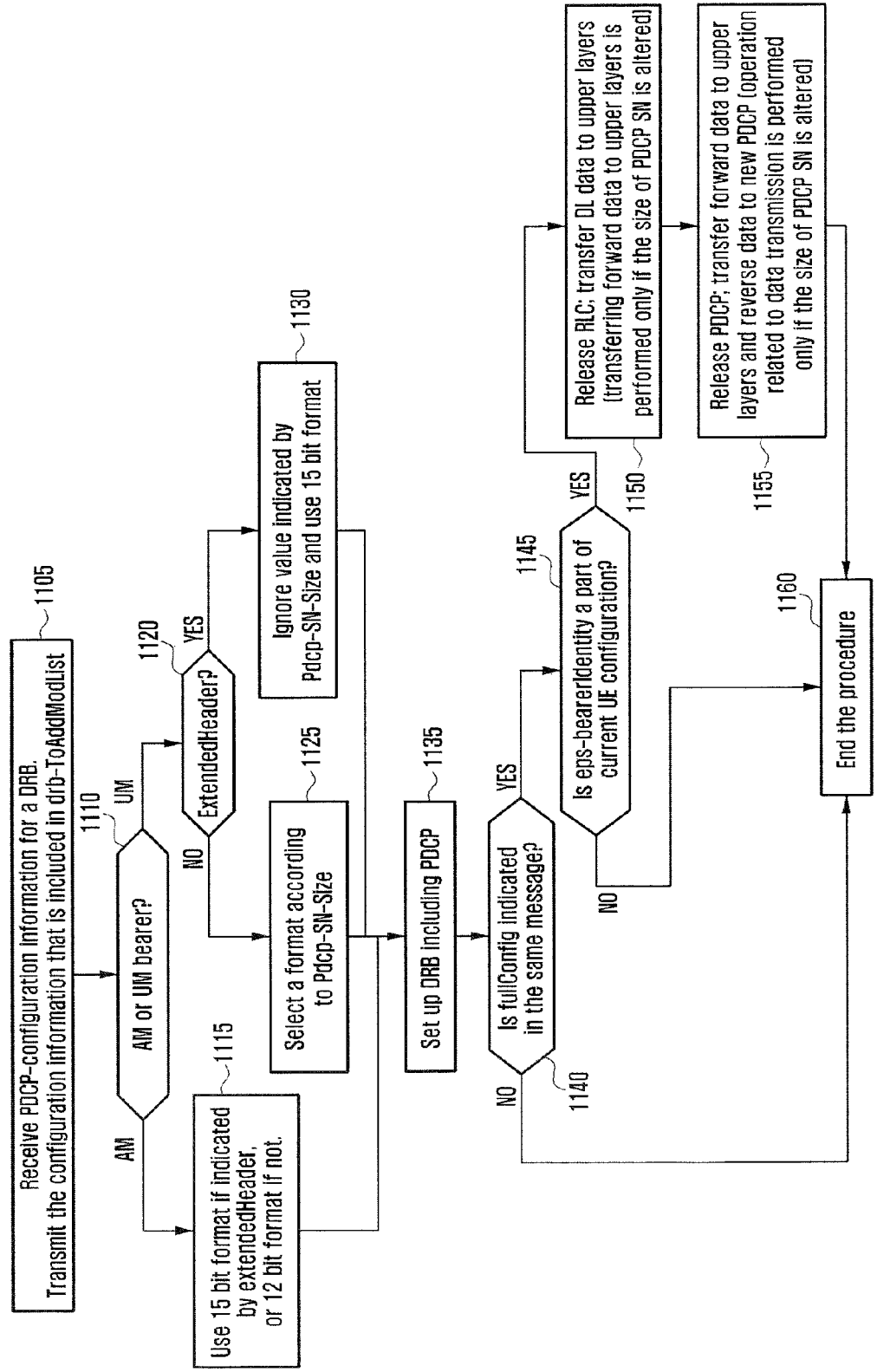
FIG. 11 illustrates a view that describes operations of a UE device according to a second embodiment of the present invention.

FIG. 11 illustrates a view that describes operations of a UE device according to a second embodiment of the present invention.

UE receives PDCP configuration information regarding a DRB at step 1105. The PDCP configuration information is included in upper information of drb-ToAddModList.

UE determines whether the DRB is an RLC Unacknowledged Mode (UM) bearer or RLC Acknowledged Mode (AM) bearer at step 1110. When UE ascertains that the DRB is an RLC AM bearer at step 1110, it proceeds with step 1115. On the contrary, when UE ascertains that the DRB is an RLC UM bearer at step 1110, it proceeds with step 1120. RLC UM bearer refers to a bearer where RLC UM is set to RLC operation mode. RLC AM bearer refers to a bearer where RLC AM is set to RLC operation mode. RLC UM refers to operation mode where Automatic Request (ARQ) is not provided. RLC AM refers to operation mode where Automatic Request (ARQ) is provided.

UE determines whether control information, an extended header, extendedHeader, as an instructor, for instructing use of extended sequence number is included in the PDCP configuration information at step 1115. When UE ascertains that extendedHeader is included in the PDCP configuration information at step 1115, it sets to use sequence number of 15 bits. On the contrary, when UE ascertains that extendedHeader isn't included in the PDCP configuration information at step 1115, it sets to use sequence number of 12 bits.

UE determines whether an extended header, extendedHeader, is included in the PDCP configuration information at step 1120. When UE ascertains that an extended header, extendedHeader, is included in the PDCP configuration information at step 1120, it proceeds with step 1130. On the contrary, when UE ascertains that an extended header, extendedHeader, isn't included in the PDCP configuration information at step 1120, it proceeds with step 1125.

UE sets the size of PDCP sequence number to 7 or 12 bits according to the control information, pdcp-SN-size, at step 1125.

UE receives a header, extendedHeader, and control information for indicating the size of PDCP SN, pdcp-SN-size, at step 1130. UE ignores the size of PDCP SN indicated by the pdcp-SN-size and uses 15 bits as the size of sequence number according to the extendedHeader.

For legacy release, the size of PDCP SN of RLC UM bearer is 7 or 12 bits and the size of PDCP SN of RLC AM bearer is 12 bits. Since RLC UM bearer is in general mapped with a low data rate, it may not need to use sequence number of 12 bits. The control information, pdcp-SN-size, is signaled only for PDCP mapped to RLC UM bearer and indicates whether to use 7 or 12 bits as the size of PDCP SN. In order to maintain the current signaling structure and set the size of sequence number to 15 bits, the present invention indicates 12 or 15 bits as the size of sequence number for RLC AM bearer by using an extendedHeader field and one of 7, 12 and 15 bits as the size of sequence number for RLC UM bearer by using an extendedHeader field and an pdcp-SN-size. The extendedHeader may be signaled or not. The pdcp-SN-size is always signaled. When extendedHeader is signaled, UE uses 15 bits as the size of sequence number regardless of the value indicated by the pdcp-SN-size. When extendedHeader isn't signaled, UE uses 7 or 12 bits as the size of sequence number according to the value indicated by the pdcp-SN-size.

UE sets up PDCP according to the PDCP configuration information at step 1135. UE also sets up DRB, mapped with the PDCP, according to information included in the drb-ToAddModList.

UE determines whether control information, fullConfig, and PDCP configuration information is included in an RRC control message at step 1140. When UE ascertains that control information, fullConfig, and PDCP configuration information is included in an RRC control message at step 1140, which means that Signaling 1 has been used, it proceeds with step 1145. On the contrary, when UE ascertains that control information, fullConfig, isn't included in an RRC control message at step 1140, it proceeds with step 1160.

UE determines whether an eps bearer identifier of the newly configured PDCP and DRB, eps-bearerIdentity, is in the current configuration of UE at step 1145. That is, UE checks whether there is a DRB whose eps-bearerIdentitiy is identical to that of newly configured DRB from among the DRBs that had been configured in UE before an RRC control message including fullConfig was received. If UE ascertains that there is no DRB whose eps-bearerIdentitiy is identical to that of newly configured DRB, it proceeds with step 1160 and ends the procedure. On the contrary, if UE ascertains that there is a DRB whose eps-bearerIdentitiy is identical to that of newly configured DRB, it proceeds with step 1150.

UE releases RLC entity of the DRB at step 1150. If there are two RLC entities configured in the DRB, UE releases them. UE assembles data of the out-of-sequence data stored in the reception buffer of the RLC entity, which can be assembled to RLC SDU, and transfers them to the upper layer, i.e., PDCP layer. The data transfer of the RLC entity to the upper layer can be performed only in case where the size of PDCP SN is altered.

UE releases PDCP entity of the DRB at step 1155. UE transfers out-of-sequence PDCP SDUs, stored in the reception buffer of the PDCP, to the upper layer. In addition, UE transfers data of type 1 and type 2 from among the data, stored in the transmission buffer of the PDCP, to a PDCP transmission buffer of a newly configured PDCP entity.

In order to release DRBs, conventional systems first released PDCP entities and then RLC entities. However, the present invention first releases RLC entities and then PDCP entities, so that data stored out-of-sequence in reception buffer can be transferred to the upper layer before the DRB is released.

The transfer of data of the PDCP entity to the upper layer and the local transfer of data to newly configured PDCP entity can be performed in only a case where the size of PDCP SN is altered.

UE ends the PDCP configuration process at step 1160.

<Embodiment 3>

Figure 12:
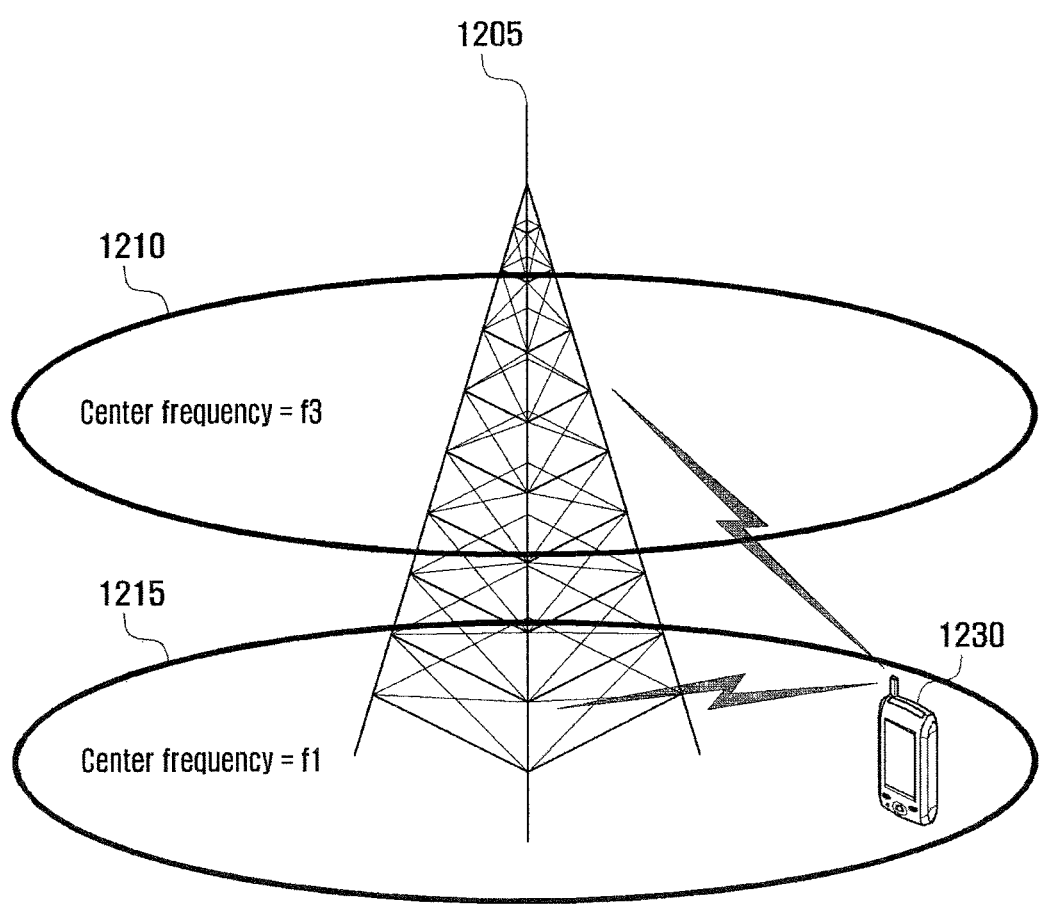
FIG. 12 illustrates a view that describes carrier integration.

In order to increase a transmission rate of user equipment (UE), carrier aggregation scheme is used to aggregate a number of serving-cells in one UE device. FIG. 12 illustrates a view that describes carrier aggregation.

Referring to FIG. 12, an ENB broadcasts/receives multi-carriers over frequency bands. For example, when an ENB 1205 broadcasts a carrier 1215 at forward center frequency f1 and a carrier 1210 at forward center frequency f3, one UE device according to conventional technology transmits/receives data via one of the carriers 1215 and 1210. However, UE of carrier aggregation can simultaneously transmit/receive data using a number of carriers. In that case, ENB 1205 can allocate more carriers to UE 1230 of carrier aggregation, so that the UE 1230 can increase the data transmission rate. As such, aggregating forward carriers and reverse carriers, transmitted or received from or by one ENB, is called 'carrier aggregation.'

In the following description, terms frequently used in this patent application are described.

If it is assumed that a cell is formed by one forward carrier and one reverse carrier that are each transmitted/received from/by one ENB, carrier aggregation may be understood as UE simultaneously transmits/receives data via a number of cells. In that case, the maximum transmission rate may increase in proportional to the number of aggregated carriers.

In the following description, receiving data by UE via a forward carrier or transmitting data by UE via a reverse carrier means that data is received/transmitted via a control channel and a data channel provided by a cell corresponding to a frequency band and a center frequency characterizing the carrier. This invention will be described in such a way that carrier aggregation is set in a number of serving cell. For the sake of convenient description of this invention, terms, such as primary serving cell (PCell), secondary serving cell (SCell), or activated serving cell, etc., will be used. These terms are also used in LTE mobile communication system and their details were described in the specifications TS36.331 and TS36.321, etc. In addition, the terms, a time alignment timer, timeAlignmentTimer, activation/deactivation MAC Control Element (CE), C-RNTI MAC CE, etc., are also used, and their details were described in the specification, TS36.321.

In order to efficiently control reverse transmission timing of aggregation serving cells, the serving cells needs to be grouped as Timing Advance Group (TAG). TAG is divided into Primary-TAG (P-TAG) and Secondary-TAG (S-TAG). P-TAG refers to TAG including PCell. S-TAG refers to TAG that includes only SCells but not PCell. For example, SCell 1, SCell 2, SCell 3 and SCell 4 are configured and uplink is configured to all the SCells. If ENB ascertains that SCell 1 and PCell may have the same reverse transmission timing and SCell 2, SCell 3 and SCell 4 may have the same reverse transmission timing, it: configures PCell and Scell 1 as P-TAG, and SCell 2, SCell 3 and SCell 4 as an S-TAG, e.g., S-TAG #1; includes the related information, SCell configuration information and TAG configuration information in a control message; and transmits it to UE. For example, the control message may include information where SCell 1 belongs to P-TAG and SCell 2, SCell 3 and SCell 4 belong to S-TAG#1. The control message may be simplified in configuration and reduce the overhead by omitting the following information instead of all the information described above.

If an SCell is not indicated by TAG-related information, the SCell is defined to belong to P-TAG. Therefore, for SCell that belongs to P-TAG, TAG-related information is omitted. In order to prevent SCells to which reverse direction is not configured from belonging to P-TAG, targets that will belong to P-TAG can be limited to serving cells to which TAG-related information isn't indicated and where the reverse direction is configured.

UE controls reverse direction transmission timings according to TAGs. Since reverse direction transmission times of serving cells that belong to different TAGs differs from each other, the reverse direction transmission of the $n^{th}$ subframe of a serving cell may be duplicated with that of the $(n+1)^{th}$ subframe of another serving cell. In that case, a definition is needed to detect the maximum reverse output power of UE by using which of reverse direction subframe of request output power.

Figure 13:
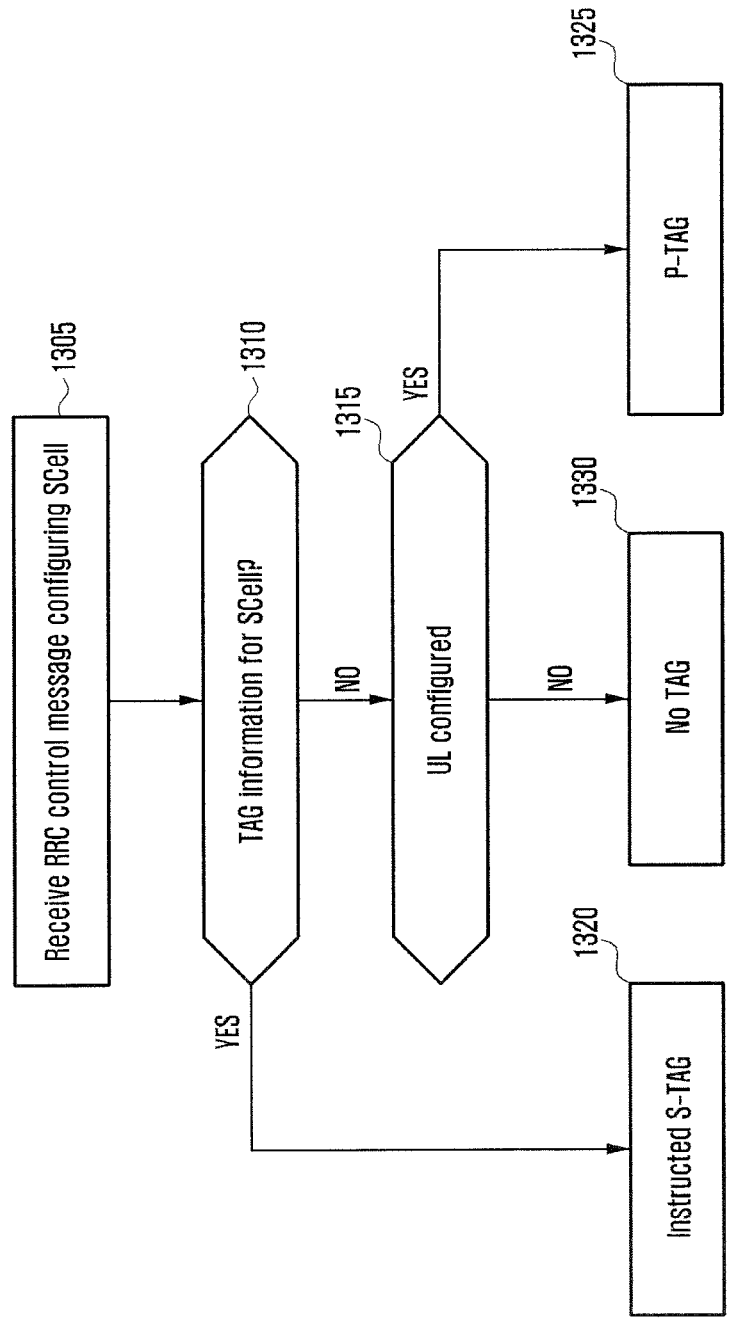
FIG. 13 illustrates a flow chart that describes operations of a UE device when it configures TAG, according to a third embodiment of the present invention.

FIG. 13 illustrates a flow chart that describes operations of a UE device when it configures TAG, according to a third embodiment of the present invention.

UE receives a control message for configuring one or more SCells at step 1305.

UE checks whether TAG-related information is included in the control messages for SCells, respectively, in order to configure TAG of SCells by the control messages at step 1310. When UE ascertains that TAG-related information is included in the control messages at step 1310, it proceeds with step 1320. At step 1320, UE affiliates the SCell with S-TAG instructed by the TAG-related information and then performs reverse direction transmission in the SCell by employing a reverse timing that is the same as serving cells that belong to S-TAG.

On the contrary, when UE ascertains that TAG-related information isn't included in the control messages at step 1310, it determines whether reverse direction has been configured in the SCell, i.e., whether a variety of reverse direction-related information for the SCells, ul-Configuration, is included at step 1315. When UE ascertains that reverse direction has been configured in the SCell at step 1315, it affiliated the SCell with P-TAG and then performs reverse direction transmission by employing at reverse direction time that is the same as the PCell at step 1325.

When UE ascertains that reverse direction has not been configured in the SCell at step 1315, it doesn't affiliate the SCell with TAG at step 1330.

Figure 14:
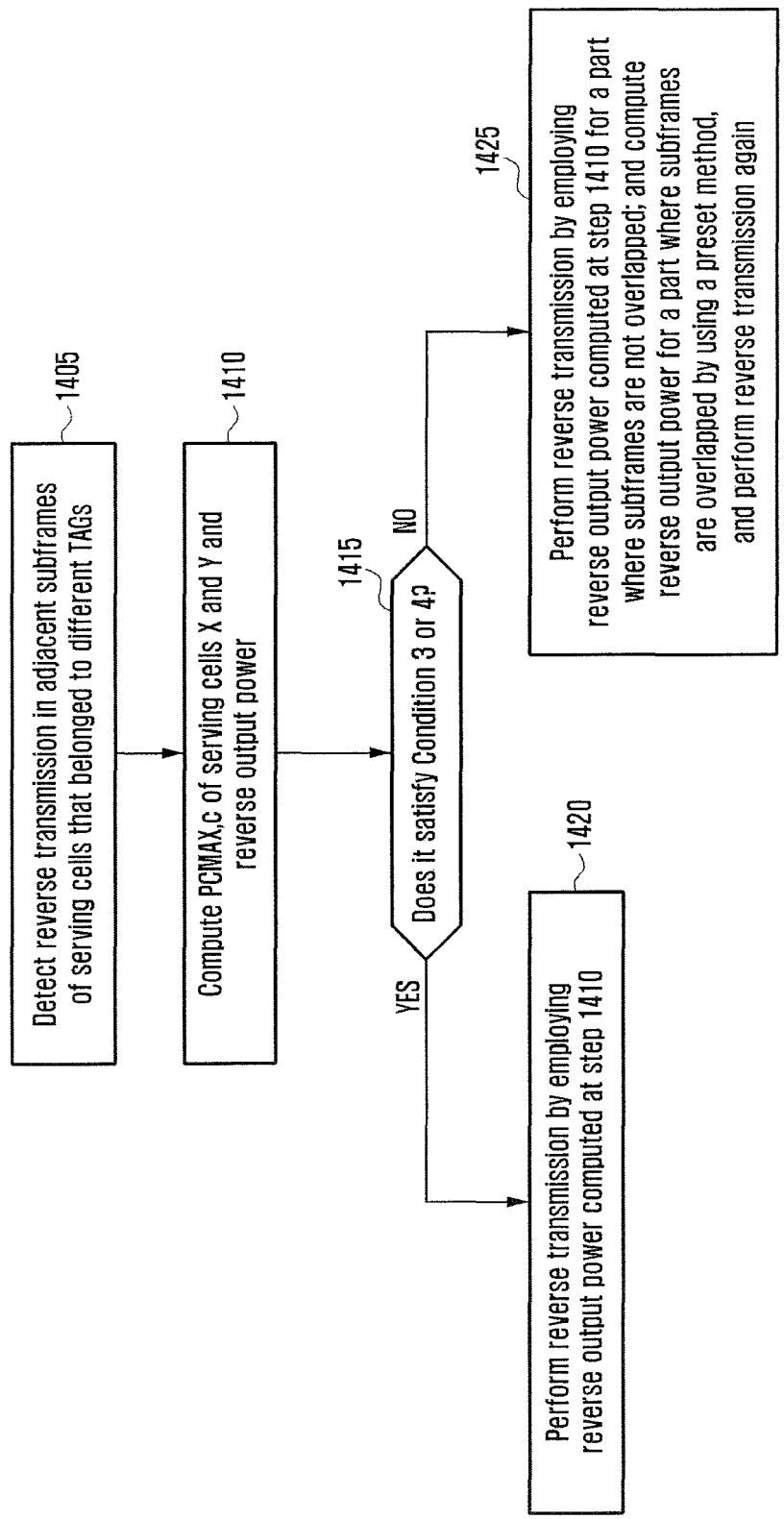
FIG. 14 illustrates a flow chart that describes operations of a UE device when reverse transmission is performed in two sub-frames adjacent to different TAG serving cells, a according to a third embodiment of the present invention.

FIG. 14 illustrates a flow chart that describes operations of a UE device when reverse direction transmission of serving cells that belonged to TAGs different from each other occurs in sub-frames adjacent to each other.

Figure 15:
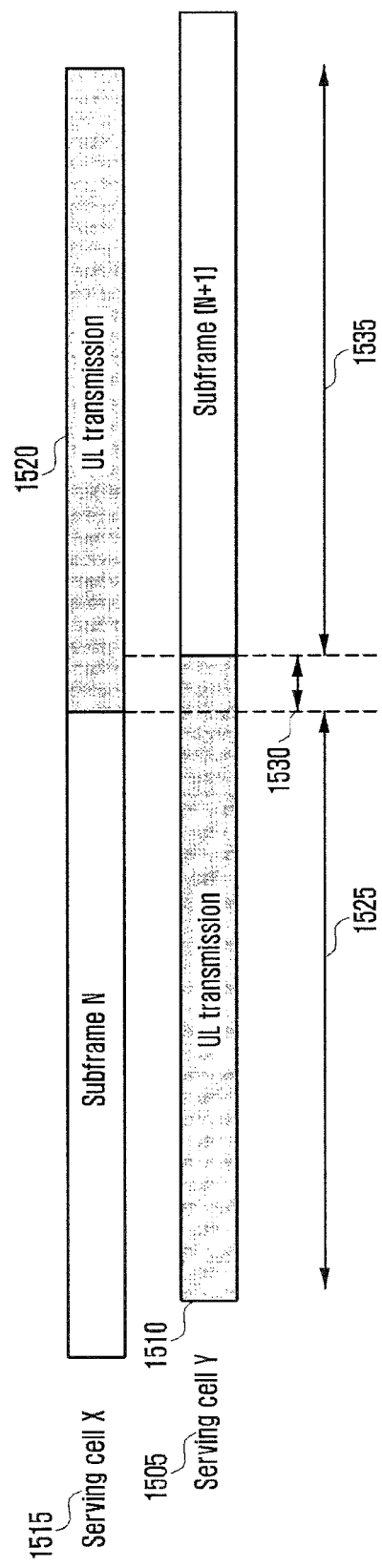
FIG. 15 illustrates a view that describes a problem where the boundaries of reverse sub-frames between two serving-cells are not bordered each other.

UE detects that: reverse direction transmission will be performed in serving cells that belonged to different TAGs; the reverse direction transmission will be performed in the two adjacent reverse direction subframes; and the reverse direction transmission timings of the two serving cells are not identical to each other, at step 1405. For example, as shown in FIG. 15, reverse direction transmission will be performed in reverse direction subframe (N), labeled by reference number 1510, of serving cell X, labeled by reference number 1505; reverse direction transmission will be performed in reverse direction subframe (N+1), labeled by reference number 1520, of serving cell Y labeled by reference number 1515; and serving cells X and Y belong to different TAGs, so boundaries of reverse direction subframes don't accord with each other. Therefore, although reverse direction transmission is performed in not the same subframes but in adjacent subframes, UE detects that two subframes are duplicated in part 1530.

UE computes power $P_{CMAX,c}$ and reverse direction output power to be applied to preceding subframes, and power $P_{CMAX,c}$ and reverse direction output power to be applied to following subframes, as follows, at step 1410. For the sake of convenience, hereinafter, a serving cell of preceding subframes is referred to as a serving cell X and a serving cell of following subframes is referred to as a serving cell Y.

$P_{CMAX,c}$ is referred to as the maximum reverse direction output power and defined according to carriers (i.e., serving cells). UE computes $P_{CMAX,c}$ by output power class $P_{powerclass}$ is of UE, the maximum output power ($P_{EMAX}$) allowed in a serving cell, Additional Maximum Power Reduction (A-MPR) provided via system information, etc., without considering whether to perform reverse direction transmission in other serving cells. This is described in detail in the specification 36.101.

UE computes output power for reverse direction transmission by transmission format, transmission resource, path loss, etc., and sets the smaller one of the calculated output power and $P_{CMAX,c}$ as a reverse direction output power.

UE determines whether to satisfy any one of Conditions 3 and 4 as follows at step 1415.

[Condition 3]

SRS transmission resources are configured in preceding subframes; UE isn't going to transmit SRS but is going to transmit PUSCH in the section where SRS transmission resources and frequency bands are overlapped; and the section 1530 where a preceding subframe and a following subframe are overlapped is shorter than the OFDM symbol size.

[Condition 4]

SRS transmission resources are configured in following subframes; and UE isn't going to transmit PUSCH in a following subframe but is going to transmit SRS.

SRS transmission is performed in the last OFDM symbol of a subframe. PUSCH transmission in a frequency band where SRS transmission resources are configured is performed in the rest of OFDM symbols except for the last OFDM symbol. On the contrary, PUSCH transmission in a frequency band where SRS transmission resources are not configured is performed in all the OFDM symbols. Therefore, if UE transmits only SRS in the following subframe, only the last OFDM symbol of the subframe is transmitted. Therefore, while UE performs a reverse direction transmission in two adjacent subframes, transmission does not simultaneously occur in the preceding subframe and the following subframe. While UE transmits only PUSCH in a preceding subframe, if the frequency resource of the PUSCH transmission is overlapped with an SRS transmission resource, UE does not transmit the last OFDM symbol in the preceding subframe. Accordingly, while UE performs a reverse direction transmission in two adjacent subframes, transmission does not simultaneously occur in the preceding subframe and the following subframe.

When any one of Conditions 3 and 4 is satisfied at step 1415, UE proceeds with step 1420. Although the preceding subframe and the following subframe overlapped each other when any one of Conditions 3 and 4 is satisfied at step 1415, reverse transmissions don't overlapped.

On the contrary, when any one of Conditions 3 and 4 isn't satisfied at step 1415, UE proceeds with step 1425.

UE performs reverse direction transmission in serving cells X and Y by using the reverse direction output power computed at step 1410.

UE performs reverse direction transmission in serving cells X and Y by using the reverse direction output power computed at step 1410 during the duration where the subframes are not overlapped. In addition, UE sets output power to perform reverse direction transmission during the duration where the subframes are overlapped, by selecting one of the following methods.

[Method 1]

UE re-computes $P_{CMAX,c}$ of serving cell X in consideration of transmission of serving cell Y and $P_{CMAX,c}$ of serving cell Y in consideration of transmission of serving cell X. If serving cells X and Y have frequency bands respectively and UE ascertains that they are a frequency band, UE reduces the minimum value $P_{CMAX\_L,c}$ of the maximum $P_{CMAX,c}$ by a preset amount. The preset amount is a value to adjust 'spurious emission,' additionally created when reverse direction transmissions are simultaneously performed in the different frequency bands, to a proper level, and may be defined as values according to the combinations of frequency bands in the standard. UE re-sets the reverse output power according to cells by using newly set $P_{CMAX,c}$. In addition, if possible, UE reduces the reverse output power according to cells at the same ratio so that the summation of the set reverse output power cannot exceed a value, thereby setting the last reverse direction output power.

[Method 2]

If PUCCH is transmitted in only one of the two subframes, UE performs a reverse direction transmission only in a serving cell transmitting PUCCH in the part 1530 where subframes are overlapped (i.e., UE uses the reverse direction output power of a corresponding cell, computed at step 1410); however, it doesn't perform a reverse direction transmission in other subframes (i.e., UE sets reverse direction output power to zero).

If PUCCH is transmitted in none or both of the two subframes, UE performs a reverse direction transmission only in a serving cell of a preceding subframe in the part where subframes are overlapped; however, it doesn't perform a reverse direction transmission in other subframes. That is, UE performs a reverse direction transmission: in the entire reverse direction subframe N in serving cell X; and in the reverse direction subframes (N+1), except for the part 1530 that is overlapped with the subframe N, in serving cell Y.

Figure 16:
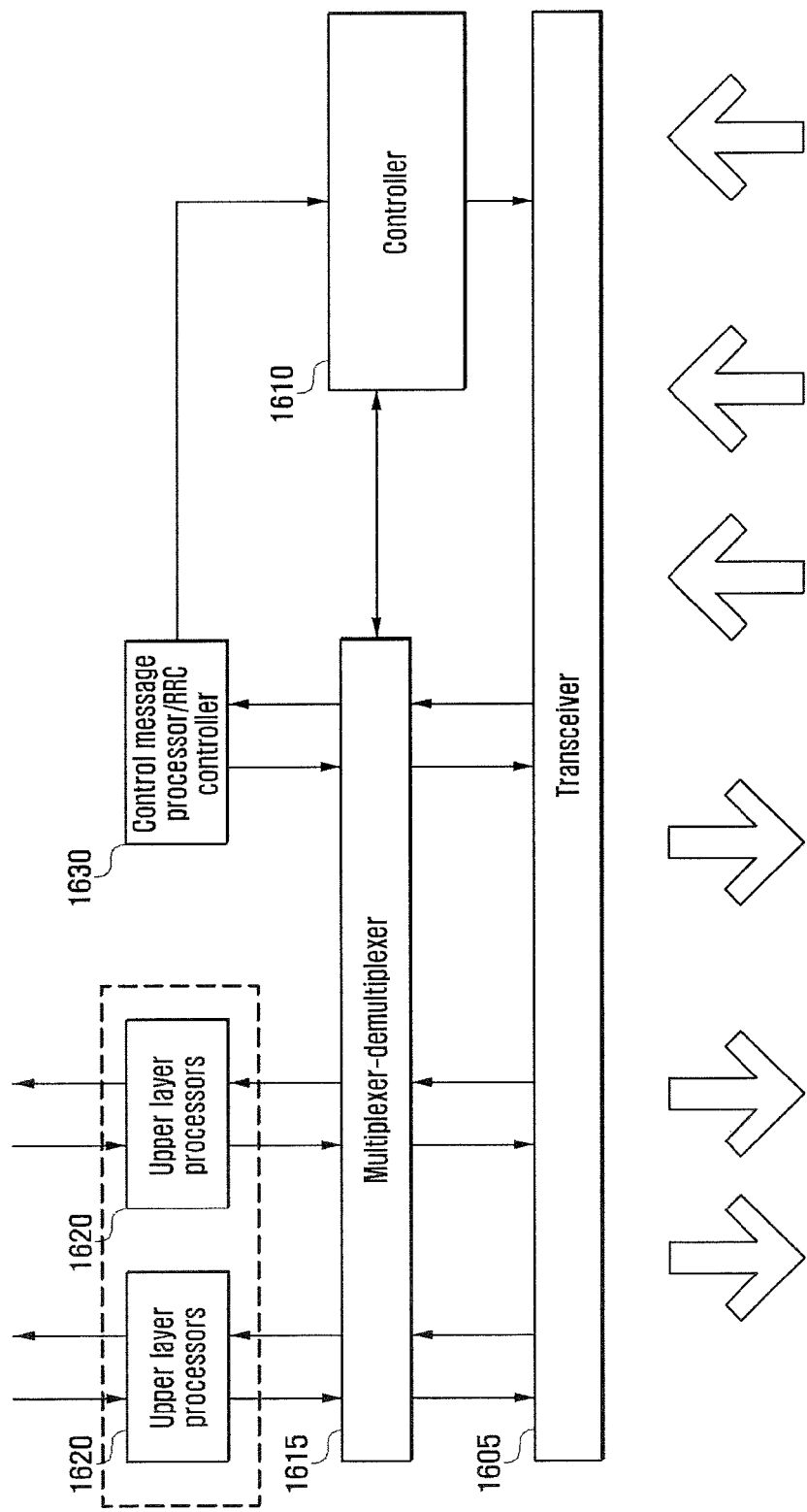
FIG. 16 illustrates a schematic block diagram of a UE device according to an embodiment of the invention.

FIG. 16 illustrates a schematic block diagram of a UE device according to an embodiment of the invention.

Referring to FIG. 16, UE includes a transceiver 1605, a controller 1610, a multiplexer-demultiplexer 1615, a control message processor/RRC controller 1630, and upper layer processors 1620 and 1625.

The transceiver 1605 receives data and control signals via a forward channel of a serving cell and also transmits data and control signals via a reverse channel. If a number of serving cells are configured, the transceiver 1605 receives/transmits data and controls signals via the serving cells.

The multiplexer-demultiplexer 1615 multiplexes data from the upper layer processors 1620 and 1625 or the control message processor 1630. The multiplexer-demultiplexer 1615 de-multiplexes data via the transceiver 1605 and transfers them to the upper layer processors 1620 and 1625 or the control message processor 1630.

The control message processor 1630 is an RRC layer device and processes control signals from ENB and performs corresponding functions. For example, the control message processor 1630 receives an RRC control message and transfers the SCell-related information, DRX-related information, etc. to the controller 1610. The control message processor 1630 detects TAG of SCell and transfers the related information to the controller 1610. The control message processor 1630 detects the instruction of fullConfig and releases/configures the PDCP/RLC layer device.

The upper layer processors 1620 and 1625 can be configured according to services. The upper layer processors 1620 and 1625 process data, created from user services such as File Transfer Protocol (FTP) or Voice over Internet Protocol (VoIP), etc., and transfer them to the multiplexer-demultiplexer 1615. In addition, the upper layer processors 1620 and 1625 process data from the multiplexer-demultiplexer 1615 and transfer them to service applications of the upper layer. The upper layer processors 1620 and 1625 may include an RLC layer device, PDCP layer device, an IP layer device, etc.

The controller 1610 detects scheduling instructions received via the transceiver 1605, e.g., reverser grants, and controls the transceiver 1605 and the multiplexer-demultiplexer 1615 to perform reverse transmission via corresponding transmission resources at a time point. The controller 1610 performs DRX operation and controls CSI or SRS transmission. The controller 1610 also computes reverse direction output power and controls it to be applied to the system. The controller 1610 controls the entire procedure related to SCell configuration, the entire process related to activation/deactivation, etc.

In particular, the controller 1610 determines whether UE satisfies Condition 1 to detect a current subframe between a first time point that DRX configuration information is received and a second time point that an event occurs that triggers the application of a short DRX cycle. When the controller 1610 ascertains that UE satisfies Condition 1, it applies preset DRX cycle to the UE.

When the controller 1610 ascertains that UE doesn't satisfy Condition 1, it determines whether UE satisfies Condition 2 to detect whether an inactivity timer has expired in the current subframe or a DRX instruction has been received. When the controller 1610 ascertains that UE satisfies Condition 2, it determines whether information related to a short DRX cycle has been received from the ENB. When the controller 1610 ascertains that short DRX cycle-related information has been received from the ENB, it performs DRX operation by employing the short DRX cycle.

On the contrary, when the controller 1610 ascertains that short DRX cycle-related information has not been received from the ENB, it performs DRX operation by employing a long DRX cycle.

When the controller 1610 ascertains that UE doesn't satisfy Condition 2, it determines whether an inactivity timer is operating for the current subframe. When the controller 1610 ascertains that an inactivity timer is operating for the current subframe, it determines whether information related to a short DRX cycle has been received from the ENB. When the controller 1610 ascertains that information related to a short DRX cycle has been received from the ENB, it performs DRX operation by employing the short DRX cycle.

When the controller 1610 ascertains that an inactivity timer isn't operating for the current subframe, it determines whether a short DRX cycle timer has expired in the current subframe. When the controller 1610 ascertains that a short DRX cycle timer has expired in the current subframe, it performs DRX operation by employing a long DRX cycle.

When the controller 1610 ascertains that a short DRX cycle timer has not expired in the current subframe, it determines whether to receive information related to a short DRX cycle from the ENB. When the controller 1610 ascertains that information related to a short DRX cycle has been received from the ENB, it performs DRX operation by employing a short DRX cycle.

Figure 17:
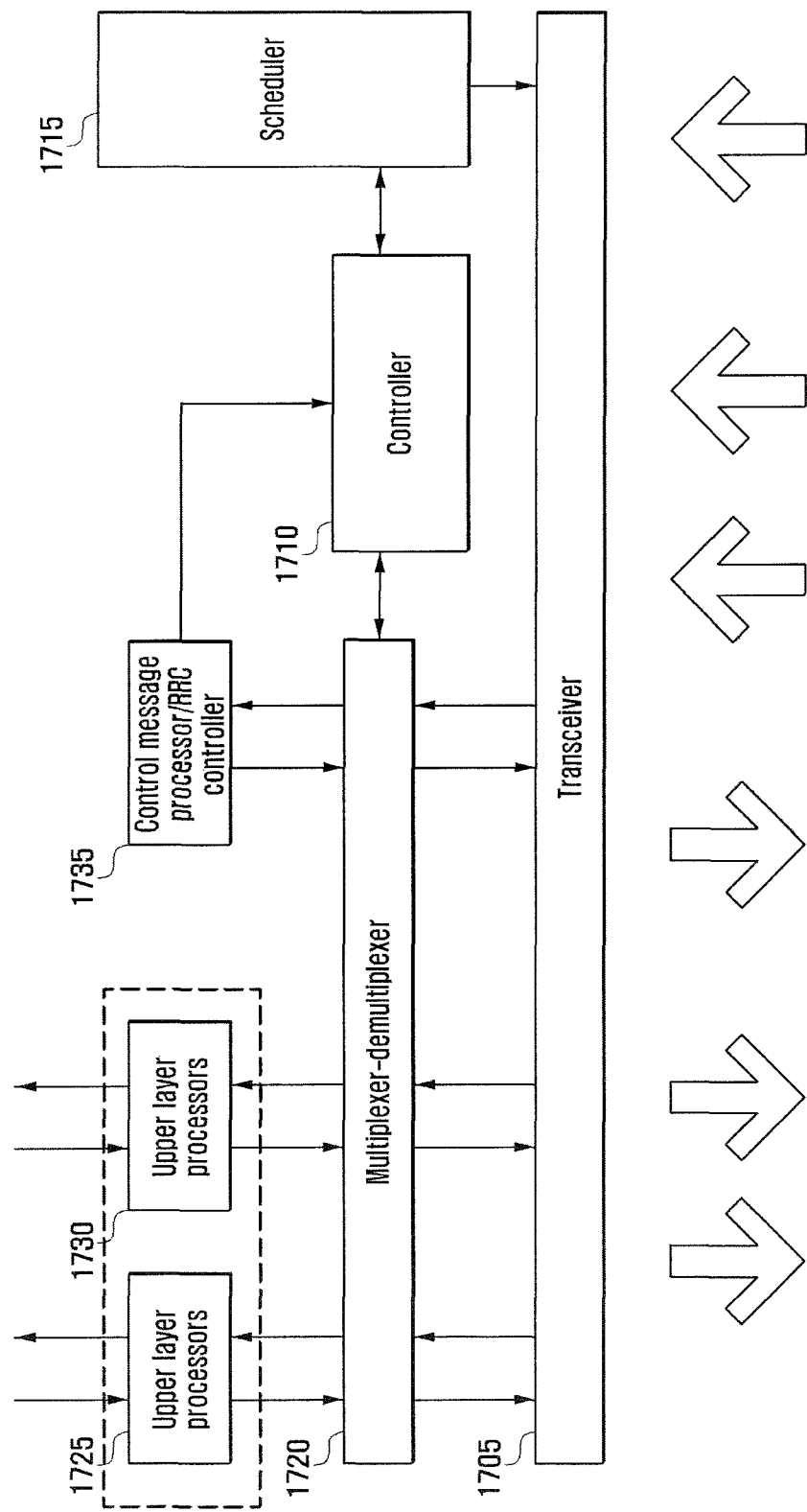
FIG. 17 illustrates a schematic block diagram of an ENB according to an embodiment of the invention.

FIG. 17 illustrates a schematic block diagram of an ENB according to an embodiment of the invention. The ENB includes a transceiver 1705, a controller 1710, a multiplexer-demultiplexer 1720, a control message processor/RRC controller 1735, upper layer processors 1725 and 1730, and a scheduler 1715.

The transceiver 1705 transmits data and control signals via a forward carrier and also receives data and control signals via a reverse carrier. If a number of carriers are configured, the transceiver 1705 receives/transmits data and controls signals via the carriers.

The multiplexer-demultiplexer 1720 multiplexes data from the upper layer processors 1725 and 1730 or the control message processor 1735. The multiplexer-demultiplexer 1720 also de-multiplexes data received via the transceiver 1705 and transfers them to the upper layer processors 1725 and 11730, the control message processor 1735, or the controller 1710. The control message processor 1735 processes control messages transmitted from UE and performs corresponding operations. The control message processor 1735 also creates control messages to be transmitted to UE and transfers them to the lower layers.

The upper layer processors 1725 and 1730 can be configured according to bearers. The upper layer processors 1725 and 1730 configure data, from S-GW or other ENBs, to RLC PDU, and transfer them to the multiplexer-demultiplexer 1720. The upper layer processors 1725 and 1730 configure RLC PDU, from the multiplexer-demultiplexer 1720, to PDCP SDU and transmit it to S-GW or other ENBs.

The scheduler 1715 assigns transmission resources to UE at a time point according to buffer state of UE, channel state, etc. The scheduler 1715 allows the transceiver 1715 to process signals transmitted from UE, or to transmit signals to UE.

The controller 1710 controls the entire procedure related to SCell configuration, the entire process related to activation/deactivation, etc. The controller 1710 detects a time that UE is activated based on DRX operation of UE, etc., and controls PDCCH transmission and CSI/SRS reception. The controller 1710 also controls functions related to the management of TAG.

Although exemplary embodiments of the invention have been described in detail above, it should be understood that many variations and modifications of the basic inventive concept herein described, which may be apparent to those skilled in the art, will still fall within the spirit and scope of the exemplary embodiments of the invention as defined in the appended claims.

The invention claimed is:

1. A method by a terminal in a mobile communication system, comprising:
   receiving discontinuous reception (DRX) configuration information from a base station;
   performing a DRX operation by applying a preset DRX cycle after the DRX configuration information is received;
   identifying whether a physical downlink channel (PDCCH) indicating a new transmission is received;
   identifying whether a channel quality indication (CQI) mask is configured;
   identifying whether the preset DRX cycle is changed into a short DRX cycle based on the PDCCH if the CQI mask is configured; and
   performing the DRX operation by applying the short DRX cycle if the preset DRX cycle is changed into the short DRX cycle.

2. The method of claim 1, further comprising identifying whether a triggering condition of the short DRX cycle is satisfied,
   wherein the identifying of whether the triggering condition of the short DRX cycle is satisfied comprises:
   determining whether an inactivity timer has expired in a current subframe or whether a DRX instruction has been received; and
   determining, if the inactivity timer has expired in the current subframe or the DRX instruction has been received, whether information related to the short DRX cycle has been received from the base station.

3. The method of claim 2, further comprising:
   performing, if the information related to the short DRX cycle has not been received from the base station, the DRX operation by applying a long DRX cycle.

4. The method of claim 2, wherein the identifying of whether the triggering condition of the short DRX cycle is satisfied further comprises:
   determining, if the inactivity timer has not expired in the current subframe and the DRX instruction has not been received, whether the inactivity timer is operating in the current subframe; and
   determining, if the inactivity timer is operating in the current subframe, whether information related to the short DRX cycle has been received from the base station.

5. The method of claim 4, wherein the identifying of whether the triggering condition of the short DRX cycle is satisfied comprises:
   determining, if the inactivity timer is not operating in the current subframe, whether a short DRX cycle timer has not expired in the current subframe; and
   determining, if the short DRX cycle timer has not expired in the current subframe, whether the information related to the short DRX cycle has been received from the base station.

6. The method of claim 5, further comprising:
   performing, if the short DRX cycle timer has expired, the DRX operation by applying a long DRX cycle.

7. The method of claim 1, wherein the DRX-configuration information comprises:
   a duration of the short DRX cycle, a duration of a long DRX cycle, information for computing a start point of DRX, information regarding a duration of on-duration (onDuration), and information regarding an expiration (length) of an inactivity timer.

8. A terminal in a mobile communication system, comprising:
   a transceiver configured to transmit and receive signals; and
   a controller configured to:
   control reception of discontinuous reception (DRX) configuration information from a base station,
   perform a DRX operation by applying a preset DRX cycle after the DRX configuration information is received,
   identify whether a physical downlink channel (PDCCH) indicating a new transmission is received,
   identify whether a channel quality indication (CQI) mask is configured,
   identify whether the preset DRX cycle is changed into a short DRX cycle based on the PDCCH if the CQI mask is configured, and
   perform the DRX operation by applying the short DRX cycle if the preset DRX cycle is changed into the short DRX cycle.

9. The terminal of claim 8, wherein the controller is further configured to:
   determine, whether an inactivity timer has expired in a current subframe or whether a DRX instruction has been received,
   determine if the inactivity timer has expired in the current subframe or the DRX instruction has been received, whether information related to the short DRX cycle has been received from the base station, and
   perform, if the information related to the short DRX cycle has been received from the base station, the DRX operation by applying the short DRX cycle.

10. The terminal of claim 9, wherein the controller is further configured to perform, if the information related to the short DRX cycle has not been received from the base station, the DRX operation by a long DRX cycle.

11. The terminal of claim 9, wherein the controller is further configured to:
    determine, if the inactivity timer has not expired in the current subframe and the DRX instruction has not been received, whether the inactivity timer is operating in the current subframe,
    determine, if the inactivity timer is operating in the current subframe, whether information related to the short DRX cycle has been received from the base station, and
    perform, if the information related to the short DRX cycle has been received from the base station, the DRX operation by applying the short DRX cycle.

12. The terminal of claim 11, wherein the controller is further configured to:
    determine, if the inactivity timer is not operating in the current subframe, whether a short DRX cycle timer has not expired in the current subframe,
    determine, if the short DRX cycle timer has not expired, whether the information related to the short DRX cycle has been received from the base station, and
    perform, if the information related to the short DRX cycle has been received from the base station, the DRX operation by applying the short DRX cycle.

13. The terminal of claim 12, wherein the controller is further configured to:
    perform, if the short DRX cycle timer has expired in the current subframe, the DRX operation by applying a long DRX cycle.

14. The terminal of claim 8, wherein the DRX-configuration information comprises a duration of the short DRX cycle, a duration of a long DRX cycle, information for computing a start point of DRX, information regarding a duration of on-duration (onDuration), and information regarding an expiration (length) of an inactivity timer.

* * * * *